United States Patent
Kashtan et al.

(10) Patent No.: US 9,704,488 B2
(45) Date of Patent: Jul. 11, 2017

(54) COMMUNICATING METADATA THAT IDENTIFIES A CURRENT SPEAKER

(71) Applicant: Microsoft Technology Licensing, LLC, Redmond, WA (US)

(72) Inventors: Guy Kashtan, Hertzlyia (IL); Benny Schlesinger, Ramat Hasharon (IL); Hen Fitoussi, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 14/664,047

(22) Filed: Mar. 20, 2015

(65) Prior Publication Data

US 2016/0275952 A1    Sep. 22, 2016

(51) Int. Cl.
*G10L 17/00* (2013.01)
*H04M 3/42* (2006.01)
(Continued)

(52) U.S. Cl.
CPC .............. *G10L 17/00* (2013.01); *G10L 17/04* (2013.01); *G10L 17/22* (2013.01); *G10L 19/018* (2013.01);
(Continued)

(58) Field of Classification Search
CPC ....... G10L 19/018; G10L 17/00; G10L 17/04; G10L 17/22
See application file for complete search history.

(56) References Cited

U.S. PATENT DOCUMENTS 5,450,481 A * 9/1995 Penzias ................. H04M 3/569
                                                        379/158
6,304,648 B1 * 10/2001 Chang ................... H04M 3/567
                                                        348/14.08
(Continued)

FOREIGN PATENT DOCUMENTS

WO    2012175556 A2    12/2012

OTHER PUBLICATIONS

Sinha et al. "Face Recognition by Humans: Nineteen Results All Computer Vision Researchers Should Know About", Proceedings of the IEEE, vol. 94, No. 11, Nov. 2006.*

(Continued)

*Primary Examiner* — Jialong He

(57) ABSTRACT

A computer system may communicate metadata that identifies a current speaker. The computer system may receive audio data that represents speech of the current speaker, generate an audio fingerprint of the current speaker based on the audio data, and perform automated speaker recognition by comparing the audio fingerprint of the current speaker against stored audio fingerprints contained in a speaker fingerprint repository. The computer system may communicate data indicating that the current speaker is unrecognized to a client device of an observer and receive tagging information that identifies the current speaker from the client device of the observer. The computer system may store the audio fingerprint of the current speaker and metadata that identifies the current speaker in the speaker fingerprint repository and communicate the metadata that identifies the current speaker to at least one of the client device of the observer or a client device of a different observer.

20 Claims, 11 Drawing Sheets

(51) Int. Cl.
*G10L 19/018* (2013.01)
*G10L 17/04* (2013.01)
*G10L 17/22* (2013.01)
*H04M 3/56* (2006.01)

(52) U.S. Cl.
CPC .............. *H04M 3/56* (2013.01); *H04M 3/569* (2013.01); *H04M 2201/41* (2013.01); *H04M 2203/5081* (2013.01); *H04M 2203/6045* (2013.01)

(56) References Cited

U.S. PATENT DOCUMENTS

| | | | |
|---|---|---|---|
| 6,457,043 B1 | 9/2002 | Kwak et al. | |
| 6,853,716 B1 | 2/2005 | Shaffer et al. | |
| 7,054,819 B1* | 5/2006 | Loveland | G06F 21/32 345/419 |
| 7,099,448 B1* | 8/2006 | Laniepce | H04M 1/578 379/202.01 |
| 7,266,189 B1 | 9/2007 | Day | |
| 7,305,078 B2 | 12/2007 | Kardos | |
| 7,995,732 B2 | 8/2011 | Koch et al. | |
| 8,050,917 B2 | 11/2011 | Caspi et al. | |
| 8,099,288 B2* | 1/2012 | Zhang | G10L 17/14 704/250 |
| 8,358,599 B2 | 1/2013 | Shaffer et al. | |
| 8,542,812 B2 | 9/2013 | Danielsen | |
| 8,553,065 B2 | 10/2013 | Gannu et al. | |
| 8,731,936 B2 | 5/2014 | Brush et al. | |
| 8,781,841 B1* | 7/2014 | Wang | H04M 3/56 379/205.01 |
| 8,791,977 B2 | 7/2014 | Marvit | |
| 2003/0125954 A1 | 7/2003 | Bradley et al. | |
| 2003/0231746 A1 | 12/2003 | Hunter et al. | |
| 2007/0260684 A1* | 11/2007 | Sharma | G06Q 10/109 709/204 |
| 2007/0263823 A1 | 11/2007 | Jalava et al. | |
| 2008/0082332 A1 | 4/2008 | Mallett et al. | |
| 2009/0225971 A1* | 9/2009 | Miller | H04M 3/42153 379/202.01 |
| 2010/0020951 A1* | 1/2010 | Basart | H04M 15/06 379/142.01 |
| 2010/0284310 A1* | 11/2010 | Shaffer | H04L 12/1822 370/260 |
| 2011/0060591 A1* | 3/2011 | Chanvez | H04M 3/2281 704/270 |
| 2012/0293599 A1* | 11/2012 | Norlin | G06K 9/00221 348/14.01 |
| 2013/0144603 A1 | 6/2013 | Lord et al. | |
| 2013/0162752 A1* | 6/2013 | Herz | H04N 7/15 348/14.08 |
| 2013/0294594 A1* | 11/2013 | Chervets | H04M 3/56 379/202.01 |
| 2013/0321133 A1* | 12/2013 | Michaelis | H04M 3/569 340/10.42 |
| 2015/0025888 A1 | 1/2015 | Sharp | |
| 2015/0255068 A1* | 9/2015 | Kim | G10L 17/04 704/246 |

OTHER PUBLICATIONS

Friedland et al., "Live Speaker Identification in Conversations", In Proceedings of the 16th ACM international conference on Multimedia, Oct. 26, 2008, 2 pages.

"International Search Report and Written Opinion Issued in PCT Application No. PCT/US2016/023000", Mailed Date: Jun. 17, 2016, 13 Pages.

Hautamaki, et al., "Merging Human and Automatic System Decisions to Improve Speaker Recognition performance", In Proceedings of Interspeech, Aug. 25, 2013, pp. 2519-2523.

"Second Written Opinion Issued in PCT Application No. PCT/US2016/023000", Mailed Date: Feb. 24, 2017, 5 Pages.

\* cited by examiner

COMMUNICATING METADATA THAT IDENTIFIES A CURRENT SPEAKER

BACKGROUND

Web-based conferencing services may include features such as Voice over Internet Protocol (VoIP) audio conferencing, video conferencing, instant messaging, and desktop sharing for allowing participants of an online meeting to communicate in real time and to simultaneously view and/or work on documents presented during a communications session. When joining an online meeting, a conference initiator or invited party may connect to the web-based conferencing service using a personal computer, mobile device, and/or landline telephone and may be prompted to supply account information or an identity and, in some cases, a conference identifier. Participants of the online meeting may act as presenters or attendees at various times and may communicate and collaborate by speaking, listening, chatting, presenting shared documents, and/or viewing shared documents.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computer system may communicate metadata that identifies a current speaker. The computer system may receive audio data that represents speech of the current speaker, generate an audio fingerprint of the current speaker based on the audio data, and perform automated speaker recognition by comparing the audio fingerprint of the current speaker against stored audio fingerprints contained in a speaker fingerprint repository. The computer system may communicate data indicating that the current speaker is unrecognized to a client device of an observer and receive tagging information that identifies the current speaker from the client device of the observer. The computer system may store the audio fingerprint of the current speaker and metadata that identifies the current speaker in the speaker fingerprint repository and communicate the metadata that identifies the current speaker to at least one of the client device of the observer or a client device of a different observer.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
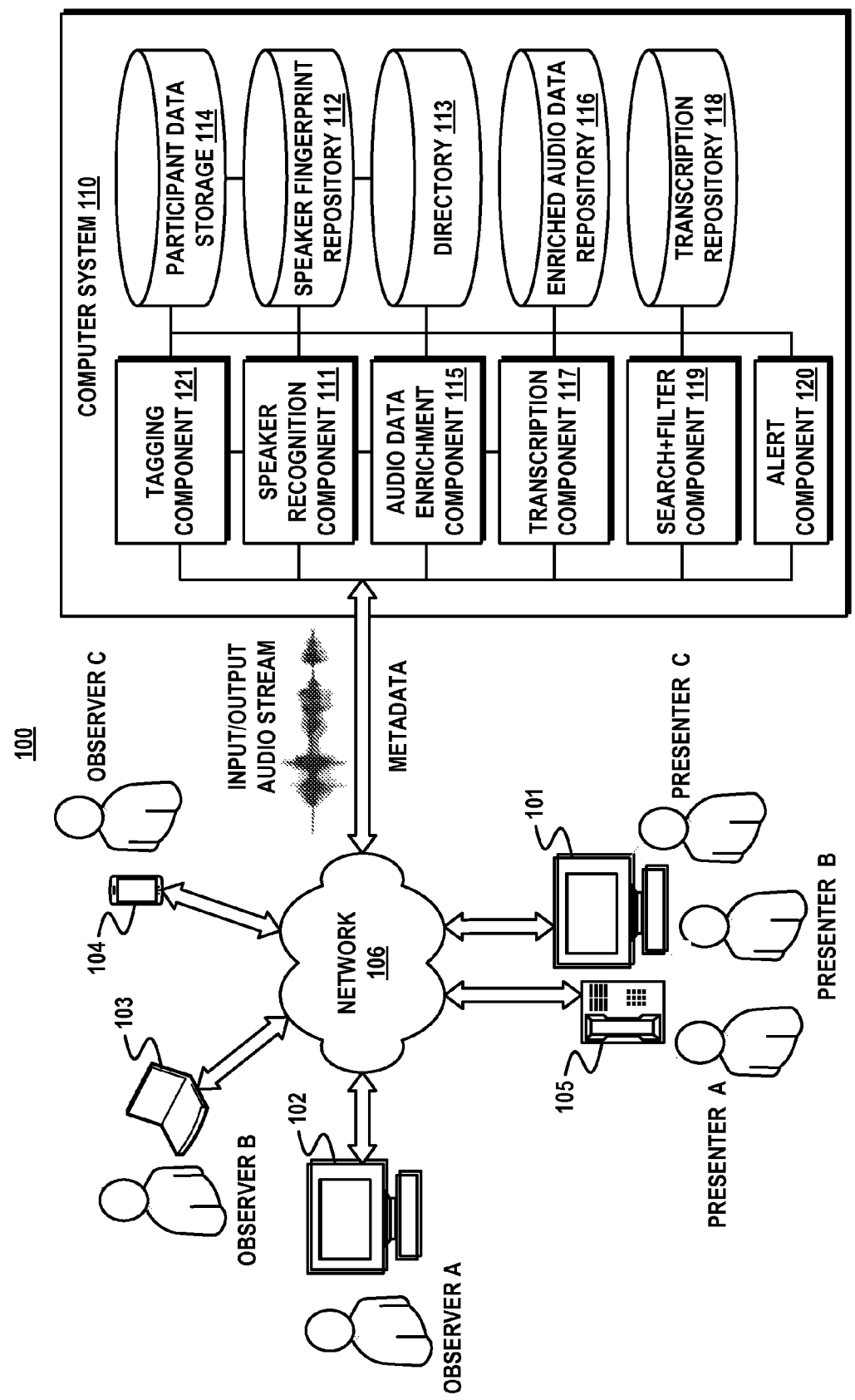
FIG. 1 illustrates an embodiment of an exemplary operating environment that may implement aspects of the described subject matter.

FIG. 1 illustrates an operating environment 100 as an embodiment of an exemplary operating environment that may implement aspects of the described subject matter. It is to be appreciated that aspects of the described subject matter may be implemented by various types of operating environments, computer networks, platforms, frameworks, computer architectures, and/or computing devices.

Implementations of operating environment 100 may be described in the context of a computing device and/or a computer system configured to perform various steps, methods, and/or functionality in accordance with aspects of the described subject matter. It is to be appreciated that a computer system may be implemented by one or more computing devices. Implementations of operating environment 100 also may be described in the context of "computer-executable instructions" that are executed to perform various steps, methods, and/or functionality in accordance with aspects of the described subject matter.

In general, a computing device and/or computer system may include one or more processors and storage devices (e.g., memory and disk drives) as well as various input devices, output devices, communication interfaces, and/or other types of devices. A computing device and/or computer system also may include a combination of hardware and software. It can be appreciated that various types of computer-readable storage media may be part of a computing device and/or computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computing device and/or computer system may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions may be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions may be stored on one or more computer-readable storage media and may be executed by one or more processors, computing devices, and/or computer systems to perform particular tasks or implement particular data types in accordance with aspects of the described subject matter.

As shown, operating environment 100 may include client devices 101-105 implemented, for example, by various types of computing devices suitable for performing operations in accordance with aspects of the described subject matter. In various implementations, client devices 101-105 may communicate over a network 106 with each other and/or with a computer system 110.

Network 106 may be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Client devices 101-105 and computer system 110 may communicate via network 106 using various communication protocols (e.g., Internet communication protocols, WAN communication protocols, LAN communications protocols, P2P protocols, telephony protocols, and/or other network communication protocols), various authentication protocols (e.g., Kerberos authentication, NT LAN Manager (NTLM) authentication, Digest authentication, and/or other authentication protocols), and/or various data types (web-based data types, audio data types, video data types, image data types, messaging data types, signaling data types, and/or other data types).

Computer system 110 may be implemented by one or more computing devices such as server computers configured to provide various types of services and/or data stores in accordance with aspects of the described subject matter. Exemplary severs computers may include, without limitation: web servers, front end servers, application servers, database servers (e.g., SQL servers), domain controllers, domain name servers, directory servers, and/or other suitable computers.

Computer system 110 may be implemented as a distributed computing system in which components are located on different computing devices that are connected to each other through network (e.g., wired and/or wireless) and/or other forms of direct and/or indirect connections. Components of computer system 110 may be implemented by software, hardware, firmware or a combination thereof. For example, computer system 110 may include components implemented by computer-executable instructions that are stored on one or more computer-readable storage media and that are executed to perform various steps, methods, and/or functionality in accordance with aspects of the described subject matter.

In some implementations, computer system 110 may provide hosted and/or cloud-based services using redundant and geographically dispersed datacenters with each datacenter including an infrastructure of physical servers. For instance, computer system 110 may be implemented by physical servers of a datacenter that provide shared computing and storage resources and that host virtual machines having various roles for performing different tasks in conjunction with providing cloud-based services. Exemplary virtual machine roles may include, without limitation: web server, front end server, application server, database server (e.g., SQL server), domain controller, domain name server, directory server, and/or other suitable machine roles.

In implementations where user-related data is utilized, providers (e.g., client devices 101-105, applications, etc.) and consumers (e.g., computer system 110, web service, cloud-based service, etc.) of such user-related data may employ a variety of mechanisms in the interests of user privacy and information protection. Such mechanisms may include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

Multi-Party Communications Session

In accordance with aspects of the described subject matter, one or more of client devices 101-105 and/or computer system 110 may perform various operations involved with communicating metadata that identifies a current speaker in the context of a multi-party communications session.

In one implementation, client devices 101-105 may be used by participants to initiate, join, and/or engage in a multi-party communications session (e.g., audio, video, and/or web conference, online meeting, etc.) for communicating in real time via one or more of audio conferencing (e.g., VoIP audio conferencing, telephone conferencing), video conferencing, web conferencing, instant messaging, and/or desktop sharing. At various times during the multi-party communications session, client devices 101-105 may be used by participants to communicate and collaborate with each other by speaking, listening, chatting (e.g., instant messaging, text messaging, etc.), presenting shared content (e.g., documents, presentations, drawings, graphics, images, videos, applications, text, annotations, etc.), and/or viewing shared content.

In an exemplary scenario shown in FIG. 1, a multi-party communications session may include multiple participants who are co-located and share the same client device. For instance, client device 101 may be a stationary computing device such as a desktop computer that is being used and shared by co-located participants including Presenter A, Presenter B, and Presenter C. During the multi-party communications session, co-located participants Presenters A-C may take turns speaking and/or presenting shared content to multiple remote participants including Observer A, Observer B, and Observer C. It is to be understood that Presenters A-C and Observers A-C represent different human participants and that the number, types, and roles of client devices 101-105 and participants (e.g., presenters/speakers and observers/listeners) are provided for purposes of illustration.

As shown, client device 102 may be a stationary client device such as a desktop computer being used by Observer A to present a visual or audiovisual representation of the multi-party communications session. Also as shown, participants may use wireless and/or mobile client devices to engage in a multi-party communications session. For instance, client device 103 may be a laptop computer used by Observer B, and client device 104 may be a smartphone used by Observer C. For the convenience of co-located participants, one of Presenters A-C may additionally use client device 105 (e.g., landline telephone, conferencing speakerphone, etc.) to dial into the multi-party communications session and communicate audio of the multi-party communications session. As mentioned above, network 106 may represent a combination of networks that may include a public switched telephone network (PSTN) or other suitable telephone network.

In situations where there are multiple speakers on the same audio stream, remote participants often have difficulties identifying who is speaking at any given moment based on the audio stream alone. This is even more of an issue and especially common when the remote participant is not very familiar with the speakers. In some cases, a visual indication of a speaking participant may be provided based on account information supplied by the participant when joining the multi-party communications session. For example, an indicator including a name and/or avatar for a participant may be displayed when the participant supplies account information to join an online meeting. However, displaying an indicator for a participant based on account information only works to identify a speaker if each participant joins individually and not when multiple speakers are co-located and share a single client device. It may often be the case that when co-located participants share a client device, only one co-located participant supplies account information to join the multi-party communications session. In such a case, names and/or avatars that are displayed based on information supplied to join the online meeting are not provided for those co-located participants who do not separately join the online meeting.

In situations where a participant uses a telephone (e.g., landline telephone, conferencing speakerphone, mobile telephone, etc.) to dial into a multi-party communications session, a telephone number may be displayed. However, displaying a telephone number may be insufficient to identify a person who is speaking to other participants. Furthermore, when a landline telephone or conferencing speakerphone is used as an additional device to join a multi-party communications session, a single participant may cause two different indicators to be displayed, which may look as if an unexpected or uninvited listener is present.

When joining and/or engaging in a multi-party communications session, a plurality (or all) of client devices 101-105 may communicate over network 106 with computer system 110. In various implementations, computer system 110 may be configured to provide and/or support a multi-party communications session. For example, computer system 110 may implement a web and/or cloud-based conferencing service configured to provide one or more of: audio conferencing (e.g., VoIP audio conferencing, telephone conferencing), video conferencing, web conferencing, instant messaging, and/or desktop sharing. In some implementations, computer system 110 may be implemented as part of a corporate intranet.

During a multi-party communications session, client devices 101-104 may present and/or computer system 110 may provide various user interfaces for allowing participants engage in the multi-party communications session. User interfaces may be presented by client devices 101-104 via a web browsing application or other suitable type of application, application program, and/or app that provides a user interface for the multi-party communications session. In various scenarios, user interfaces may be presented after launching an application (e.g., web browser, online meeting app, messaging app, etc.) that allows a user to join and engage in a multi-party communications session.

Client devices 101-104 may be configured to receive and respond to various types of user input such as voice input, keyboard input, mouse input, touchpad input, touch input, gesture input, and so forth. Client devices 101-104 may include hardware (e.g., microphone, speakers, video camera, display screen, etc.) and software for capturing speech, communicating audio and/or video data, and outputting an audio, video, and/or audiovisual representation of a multi-party communications session. Client devices 101-104 also may include hardware and software for providing client-side speech and/or speaker recognition. When employed, client device 105 (e.g., landline telephone, conferencing speakerphone, etc.) may enable communication of only audio only.

Computer system 110 may be configured to perform various operations involved with receiving and processing audio data (e.g., input audio stream) that represents speech of a current speaker and communicating metadata that identifies the current speaker. Computer system 110 may receive audio data representing speech of a current speaker in various ways. In one implementation, communication among client devices 101-105 may take place through computer system 110, and audio data output from any one of client devices 101-105 may flow into computer system 110 and may be processed in real time. In another implementation, computer system 110 may support a multi-party communications session automatically or in response to a request from a participant and may receive and analyze audio communication among client devices 101-105.

Computer system 110 may include a speaker recognition component 111 configured to process the audio data representing speech of a current speaker. Audio data output from any one of client devices 101-105 may be received by and/or directed to speaker recognition component 111 for processing. In various implementations, speaker recognition component 111 may process the audio data representing speech of a current speaker to generate an audio fingerprint of the current speaker. For instance, speaker recognition component 111 may process audio data to determine and/or extract one or more speech features that may be used to characterize the voice of the current speaker and may generate an audio fingerprint of the current speaker based on one or more speech features of the audio data. Exemplary speech features may include, without limitation: pitch, energy, intensity, duration, zero-crossing rate, rhythm, cadence, tone, timbre, formant positions, resonance properties, short-time spectral features, linear prediction coefficients, mel-frequency cepstral coefficients (MFCC), phonetics, semantics, pronunciations, dialect, accent, and/or other distinguishing speech characteristics. An audio fingerprint of the current speaker may implemented as one or more of: a voiceprint, a voice biometric, a speaker template, a feature vector, a set or sequence of feature vectors, a speaker model such as a distribution of feature vectors, a speaker codebook such as set of representative code vectors or centroids created by vector quantizing an extracted sequence of feature vectors, and/or other suitable speaker fingerprint.

Speaker recognition component 111 may perform automated speaker recognition to recognize or attempt to recognize the current speaker utilizing the audio fingerprint of the current speaker. In various implementations, speaker recognition component 111 may compare the audio fingerprint of the current speaker against stored audio fingerprints for individuals who have been previously recognized by computer system 110 and/or speaker recognition component 111. For instance, speaker recognition component 111 may determine distances, such as Euclidean distances, between features of the audio fingerprint for the current speaker and features of the stored audio fingerprints. Speaker recognition component 111 may recognize the current speaker based on a stored audio fingerprint that has the minimum distance as long as such stored audio fingerprint is close enough to make a positive identification. Exemplary feature matching techniques may include, without limitation: hidden Markov model (HMM) techniques, dynamic time warping (DTW) techniques, vector quantization techniques, neural network techniques, and/or other suitable comparison techniques.

Computer system 110 may include a speaker fingerprint repository 112 configured to store audio fingerprints of individuals who have been previously recognized by computer system 110 and/or speaker recognition component 111. Speaker finger repository 112 may be implemented as a common repository of stored audio fingerprints and may associate each stored audio fingerprint with metadata such as a name or other suitable identity of an individual. Speaker finger repository 112 may store audio fingerprints for various groups of people. For instance, speaker fingerprint repository 112 may be associated with an organization and configured to store audio fingerprints of employees, members, and/or affiliates of the organization.

Computer system 110 may include a directory 113 configured to maintain various types of personal and/or professional information related to individuals associated with a particular organization or group. For instance, directory 113 may contain organizational information for an individual such as name, company, department, job title, contact information, avatar (e.g., profile picture), electronic business card, and/or other types of profile information. In various implementations, directory 113 and speaker finger repository 112 may be associated with each other. For example, personal or professional information for an individual that is stored in directory 113 may reference or include a stored audio fingerprint for the individual. Alternatively or additionally, metadata that is associated with a stored audio fingerprint in speaker fingerprint repository 112 may reference or include various types of information from directory 113. While shown as separate storage facilities, directory 113 and speaker fingerprint repository 112 may be integrated in some deployments.

In some implementations, computer system 110 may include a participant data storage 114 configured to temporarily store participant information for quick access and use during a multi-party communications session. For instance, when participants (e.g., Presenter A and Observers A-C) supply account information to individually join an online meeting, personal or professional information that is available for such participants may be accessed from directory 113 and temporarily stored in participant data storage 114 for displaying names, avatars, and/or other organizational information in a user interface that presents an online meeting. Likewise, stored audio fingerprints that are available for such participants may be accessed from speaker fingerprint repository 112 and temporarily stored in participant data storage 114 to facilitate speaker recognition. When participant data storage 114 contains one or more stored audio fingerprints of participants, speaker recognition component 111 may perform automated speaker recognition by first comparing the generated audio fingerprint of the current speaker against stored audio fingerprints in participant data storage 114 and, if automated speaker recognition is unsuccessful, comparing the audio fingerprint of the current speaker against stored audio fingerprints in speaker fingerprint repository 112. While shown as separate storage facilities, participant data storage 114 and speaker fingerprint repository 112 may be implemented as separate areas within the same storage facility in some deployments.

In some implementations, one or more of client devices 101-104 may include speech and/or speaker recognition functionality and may share a local audio fingerprint of a participant with computer system 110. A local audio fingerprint of a participant that is provided by one or more of client devices 101-104 may be temporarily stored in participant data storage 114 for access during a current multi-party communications session and also may be persistently stored in speaker fingerprint repository 112 and/or directory 113 for use in subsequent multi-party communications sessions. In some cases, a local audio fingerprint of a participant that is provided by one or more of client devices 101-104 may be used to enhance, update, and/or replace an existing stored audio fingerprint of the participant that is maintained by computer system 110.

Computer system 110 and/or speaker recognition component 111 may perform automated speaker recognition by comparing the generated audio fingerprint of the current speaker against stored audio fingerprints which may be contained in one or more of speaker fingerprint repository 112, directory 113, and/or participant data storage 114. If the current speaker is successfully recognized based on a stored audio fingerprint, computer system 110 and/or speaker recognition component 111 may retrieve a name or other suitable identity of an individual associated with the stored audio fingerprint and communicate metadata that identifies the current speaker. In various implementations, metadata that identifies the current speaker may be communicated over network 106 to client devices 101-104. In response to receiving such metadata, each of client devices 101-104 may display an indicator identifying the current speaker within a user interface that presents the multi-party communications session. Alternatively, to avoid interrupting or distracting the current speaker, the indicator identifying the current speaker may be displayed only by client devices which are being used by participants other than the current speaker, and/or the metadata that identifies the current speaker may be communicated only to client devices which are being used by participants other than the current speaker.

In some implementations, the metadata that identifies the current speaker may include additional information such as one or more of: a company of the current speaker, a department of the current speaker, a job title of the current speaker, contact information for the current speaker, and/or other profile information for the current speaker. Such additional information may be retrieved from directory 113, for example, and included within the metadata communicated by computing system 110. Any of client devices 101-104 that receive such metadata may display the additional information within the indicator identifying the current speaker or elsewhere within the user interface that presents the multi-party communications session. Alternatively, the metadata may include only the name or identity of the current speaker which may be used by any of client devices 101-104 that receive such metadata to query directory 113 for additional information and to populate the indicator identifying the current speaker and/or the user interface with the additional information.

The indicator identifying the current speaker also may include a confirm button or other suitable graphical display element for requesting participants to confirm that the current speaker has been correctly recognized. Upon receiving confirmation of the identity of the current speaker from one or more participants, the stored audio fingerprint for the current speaker that is maintained by speaker fingerprint repository 112 may be further enhanced using the audio fingerprint of the current speaker that was generated by speaker recognition component 111 and/or other audio data representing speech of the current speaker.

Computer system 110 may include an audio data enrichment component 115 configured to augment audio data that represents speech of a current speaker with metadata that identifies the current speaker. For instance, when speaker recognition component 111 successfully recognizes the current speaker, input audio data (e.g., input audio stream) may be directed to audio data enrichment component 115 for processing. In various implementations, audio data enrichment component 115 may process an audio stream by generating a metadata stream that is synchronized with the audio stream data based on time. The metadata stream may be implemented as a sequence of metadata that identifies a recognized speaker and includes a starting time and ending time for speech of each recognized speaker. For example, when a new recognized speaker is detected, an ending time for the previous recognized speaker and a starting time for the new recognized speaker may be created. Audio data enrichment component 115 also may retrieve additional personal or professional information (e.g., name, company, department, job title, contact information, and/or other profile information) for the recognized speaker from directory 113 or other information source and include such additional information within the metadata stream. The augmented audio stream may be communicated as synchronized streams of audio and metadata or as packets of audio data integrated with packets of metadata. Augmented audio data including metadata that identifies a recognized speaker may be output by computer system 110 in real time and may be rendered by client devices 101-104 to identify each recognized speaker who is currently speaking in the multi-party communications session.

In some implementations, one or more of client devices 101-104 may include speech and/or speaker recognition functionality, and a client device of a speaking participant may share local metadata that identifies the speaking participant with computer system 110. The local metadata that is provided by one or more of client devices 101-104 may be received by computer system 110 and communicated to each of client devices 101-104 or to only client devices which are being used by participants other than the current speaker. The local metadata that is provided by one or more of client devices 101-104 also may be received by computer system 110 and used to augment audio data that represents speech of a current speaker with metadata that identifies the current speaker.

Computer system 110 may include an enriched audio data repository 116 configured to store enriched audio data that has been augmented with metadata that identifies one or more recognized speakers. In various implementations, audio data enrichment component 115 may create a recording of a conversation that includes multiple speakers as a multi-party communications session occurs. The recorded conversation may include metadata that is synchronized with the audio data and that identifies recognized speakers. During playback of the recorded conversation by one or more of client devices 101-104, for example, the metadata may be rendered to display the name, identity, and/or additional personal or professional information of a recognized speaker as audio associated with the recognized speaker is played.

Computer system 110 may include a transcription component 117 configured to generate a textual transcription of a multi-party communication session. Transcription component 117 may generate the textual transcription in real time based on augmented audio data provided by audio data enrichment component. For example, as augmented audio data is begin stored in enriched audio data repository 116, transcription component 117 may simultaneously generate a textual transcription of the augmented audio data. Alternatively, transcription component 117 may generate the textual transcription at a later time based on augmented audio data that has been stored in enriched audio data repository 116. In various implementations, transcription component 117 may transcribe a conversation that includes one or more recognized speakers, and the textual transcription may include an identifier for a recognized speaker that is associated with the text of speech spoken by the recognized speaker.

Computer system 110 may include a transcription repository 118 configured to store textual transcriptions of multi-party communications sessions. Transcription repository 118 may maintain one or more stored transcriptions associated with a current multi-party communications session as well as stored transcriptions associated with other multi-party communications sessions. In various implementations, transcription component 117 may provide a textual transcription to client devices 101-104 at the conclusion of a multi-party communications session and/or at some other point in time when requested by a participant.

Computer system 110 may include a search and filter component 119 configured to perform searching and/or filtering operations utilizing metadata that identifies a recognized speaker. For instance, search and filter component 119 may receive a query indicating a recognized speaker, search for metadata that identifies the recognized speaker, and perform various actions and/or provide various types of output. In some cases, search and filter component 119 may search augmented audio data for metadata that identifies the recognized speaker and provide portions of the augmented audio data that represent speech of the recognized speaker. Search and filter component 119 also may search one or more textual transcriptions for an identifier for the recognized speaker and provide portions of the transcript that include the text of speech spoken by the recognized speaker.

In various implementations, search and filter component 119 may perform operations on augmented audio data that is being communicated in real time. For example, during a multi-party communications session, additional documents or other types of content that are contextually related to a particular recognized speaker may be obtained and made available to participants of the multi-party communications session. A participant also may request audio data representing speech of a particular recognized speaker (e.g., lead presenter) to be rendered louder relative to other speakers who, in some cases, may be sharing the same client device as particular recognized speaker.

Computer system 110 may include an alert component 120 configured to generate an alert when a particular recognized speaker is currently speaking. For example, alert component 120 may receive a request from a participant that identifies a particular recognized speaker, operate on metadata included in augmented audio data that is being communicated in real time, and transmit data to the client device of the participant for generating an audible and/or visual alert whenever the particular recognized speaker talks.

Computer system 110 may include a tagging component 121 configured to request and receive tagging information specifying an identity of a current speaker in the event that the current speaker is not recognized by computer system 110. For instance, there may be situations where speaker fingerprint repository 112 does not contain a stored audio fingerprint of a current speaker and/or speaker recognition component 111 is unable to match a generated audio fingerprint of the current speaker with a stored audio fingerprint that is close enough to make a positive identification.

In situations where the current speaker is not successfully recognized based on a stored audio fingerprint, computer system 110 and/or tagging component 121 may communicate data to present an indication (e.g., message, graphic, etc.) that a speaker is unrecognized. Computer system 110 and/or tagging component 121 also may request one or more participants to supply tagging information such as a name or other suitable identity of the unrecognized speaker. In various implementations, a request for tagging information may be communicated over network 106 to client devices 101-104. In response to receiving a request for tagging information, each of client devices 101-104 may display a dialog box that prompts each participant to tag the unrecognized speaker within a user interface that presents the multi-party communications session. To avoid interrupting or distracting the current speaker, the dialog box may be displayed only by client devices which are being used by participants other than the current speaker, and/or the request for tagging information may be communicated only to client devices which are being used by participants other than the current speaker.

One or more of client devices 101-104 may supply tagging information for the unrecognized speaker in response to a participant manually inputting of a name or identity of the unrecognized speaker, a participant selecting user profile information from directory 113, a participant selecting an avatar that is displayed for the unrecognized current speaker in the user interface that present the multi-party communications session, and/or other participant input identifying the unrecognized speaker. In some cases, tagging component 121 may receive tagging information that identifies the unrecognized speaker from one or more participants. In the event that different participants supply conflicting tagging information (e.g., different names) for the current speaker, tagging component 121 may identify the current speaker based on an identity supplied by a majority of participants or other suitable heuristic to resolve the conflict.

Upon receiving tagging information identifying the unrecognized speaker, tagging component 121 may communicate metadata that identifies the current speaker over network 106 to client devices 101-104. In response to receiving such metadata, each of client devices 101-104 may display an indicator identifying the current speaker within a user interface that presents the multi-party communications session. Organizational information (e.g., name, company, department, job title, contact information, and/or other profile information) for the current speaker may be retrieved from directory 113 or other information source, included in the metadata that identifies the current speaker, and displayed within the indicator identifying the current speaker or elsewhere within the user interface that presents the multi-party communications session. To avoid interrupting or distracting the current speaker, the indicator identifying the current speaker may be displayed only by client devices which are being used by participants other than the current speaker, and/or the metadata that identifies the current speaker may be communicated only to client devices which are being used by participants other than the current speaker.

The indicator identifying the current speaker also may include a confirm button or other suitable graphical display element for requesting participants to confirm that the current speaker has been correctly recognized. Upon receiving confirmation of the identity of the current speaker from one or more participants, the audio fingerprint of the current speaker that was generated by speaker recognition component 111 may be associated with metadata identifying the current speaker and stored in one or more of speaker fingerprint repository 112, directory 113, or participant data storage 114. The stored audio fingerprint of the current user may be used to perform speaker recognition during the current multi-party communications session or a subsequent multi-party communications session. For instance, computer system 110 may receive subsequent audio data that represents speech of the current speaker, generate a new audio fingerprint of the current speaker based on the subsequent audio data, and perform automated speaker recognition by comparing the new audio fingerprint of the current speaker against the stored audio fingerprint of the current speaker.

Exemplary User Interface

FIGS. 2A-D illustrate a user interface 200 as an embodiment of an exemplary user interface that may implement aspects of the described subject matter. It is to be appreciated that aspects of the described subject matter may be implemented by various types of user interfaces that may be presented by client devices 101-104 or other suitable computing device and/or provided by computer system 110 or other suitable computer system.

Figure 2A:
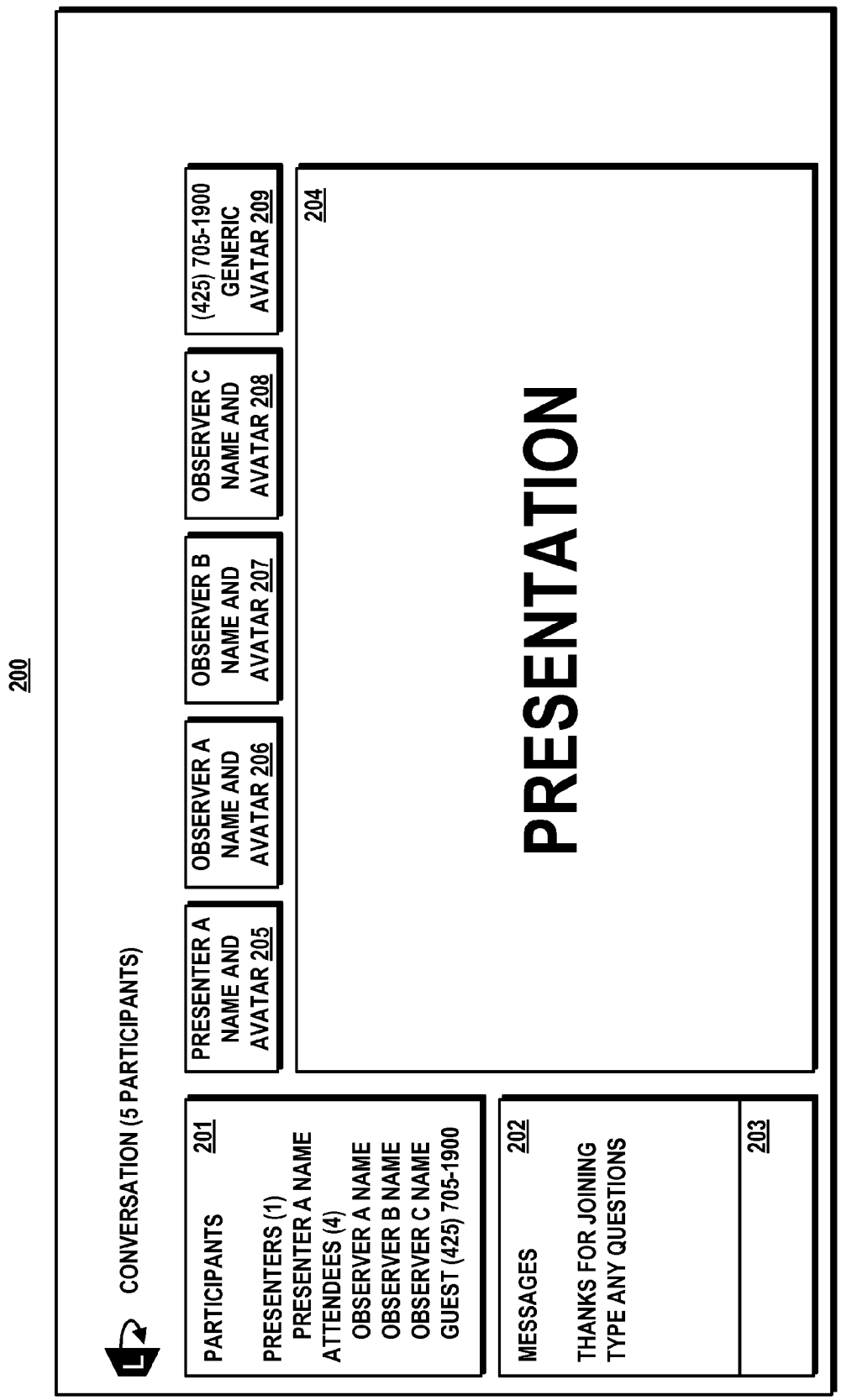
FIGS. 2A-2D illustrates an embodiment of an exemplary user interface in accordance with aspects of the described subject matter.

Referring to FIG. 2A with continuing reference to the foregoing figures, user interface 200 may be displayed by one or more of client devices 101-104 to present a visual representation of an online meeting. User interface 200 may be presented during an exemplary scenario where Presenter A and Observers A-C respectively use client devices 101-104 to join the online meeting and individually supply account information to computer system 110 which provides and/or supports the online meeting. In this exemplary scenario, Presenters A-C are co-located (e.g., in the same conference room) and use client device 101 to present a visual or audiovisual representation of the online meeting and to share content with Observers A-C. In this exemplary scenario Presenter A also dials into the online meeting via client device 105 (e.g., landline telephone, conferencing speakerphone, etc.) which then can be used by Presenters A-C to communicate audio of the online meeting.

As described above, computer system 110 may include speaker fingerprint repository 112 configured to store audio fingerprints for Presenters A-C and Observers A-C and may include stored audio fingerprints and associated metadata (e.g., name, identity, etc.) for any participants who have been previously recognized by computer system 110. Computer system 110 may include a directory 113 configured to maintain various types of personal and/or professional information (e.g., name, company, department, job title, contact information, avatar (e.g., profile picture), electronic business card, and/or other types of profile information) related to one or more of Presenter A-C and Observers A-C. Directory 113 may reference or include a stored audio fingerprint for the individual and/or metadata that is associated with a stored audio fingerprint in speaker fingerprint repository 112 may reference or include various types of information from directory 113.

In some implementations, computer system 110 may include participant data storage 114 configured to temporarily store participant information (e.g., profile information from directory 113, stored audio fingerprints and metadata from speaker fingerprint repository 112, etc.) when Presenter A and Observers A-C join the online meeting. Computer system 110 also may request and receive local audio fingerprints and/or local metadata from any one client devices 101-104 that include speech and/or speaker recognition functionality when Presenter A and Observers A-C join the online meeting. A local audio fingerprint, if provided, may be stored in one or more of participant data storage 114, speaker fingerprint repository, or directory 113 for performing automated speaker recognition and/or may be used to enhance, update, and/or replace an existing stored audio fingerprint a participant that is maintained by computer system 110.

User interface 200 may indicate the number of detected participants in an online meeting and may include a participants box 201 configured to list participants of the online meeting. As shown, user interface 200 may indicate five detected participants based on client devices 101-105, and participants box 201 may display names of Presenter A, Observer A, Observer B, and Observer C based on account information supplied by the participants when joining the online meeting. Participant names may be obtained from directory 112 and/or participant data storage 114. Participants box 201 also may display a telephone number of client device 105 as well as an indication that a guest is present in the online meeting. Participants box 201 may indicate whether each participant is a presenter or attendee and the number of presenters and attendees. In this example, participant names are displayed based on account information and are not provided for Presenter B and Presenter C who do not individually supply account information to join the online meeting.

User interface 200 may present a messages box 202 configured to display instant messages communicated to all participants of the online meeting. Messages box 202 may allow participants to chat in real time and display an instant message conversation including all instant messages submitted during the online meeting. Messages box 202 may include a message composition area 203 for composing a new instant message to be displayed to all participants of the online meeting.

User interface 200 may display a presentation 204 to participants of the online meeting. Presentation 204 may represent various types of content (e.g., documents, presentations, drawings, graphics, images, videos, applications, text, annotations, etc.) that may be shared with participants of the online meeting. For example, presentation 204 may be a slide show or other type of document that is shared by Presenter A and displayed by client devices 101-104.

User interface 200 may display names and avatars for participants. As shown, user interface 200 may display Presenter A name and avatar 205, Observer A name and avatar 206, Observer B name and avatar 207, and Observer C name and avatar 208 based on account information supplied by the participants when joining the online meeting. The participant names and avatars 205-208 (e.g., profile pictures) may be obtained from directory 112 and/or participant data storage 114. In this example, the participant names and avatars 205-208 are displayed based on account information and are not provided for Presenter B and Presenter C who do not individually supply account information to join the online meeting. User interface 200 also may display a telephone number of client device 105 and a generic avatar 209 in response to Presenter A using client device 105 to dial into the online meeting.

Figure 2B:
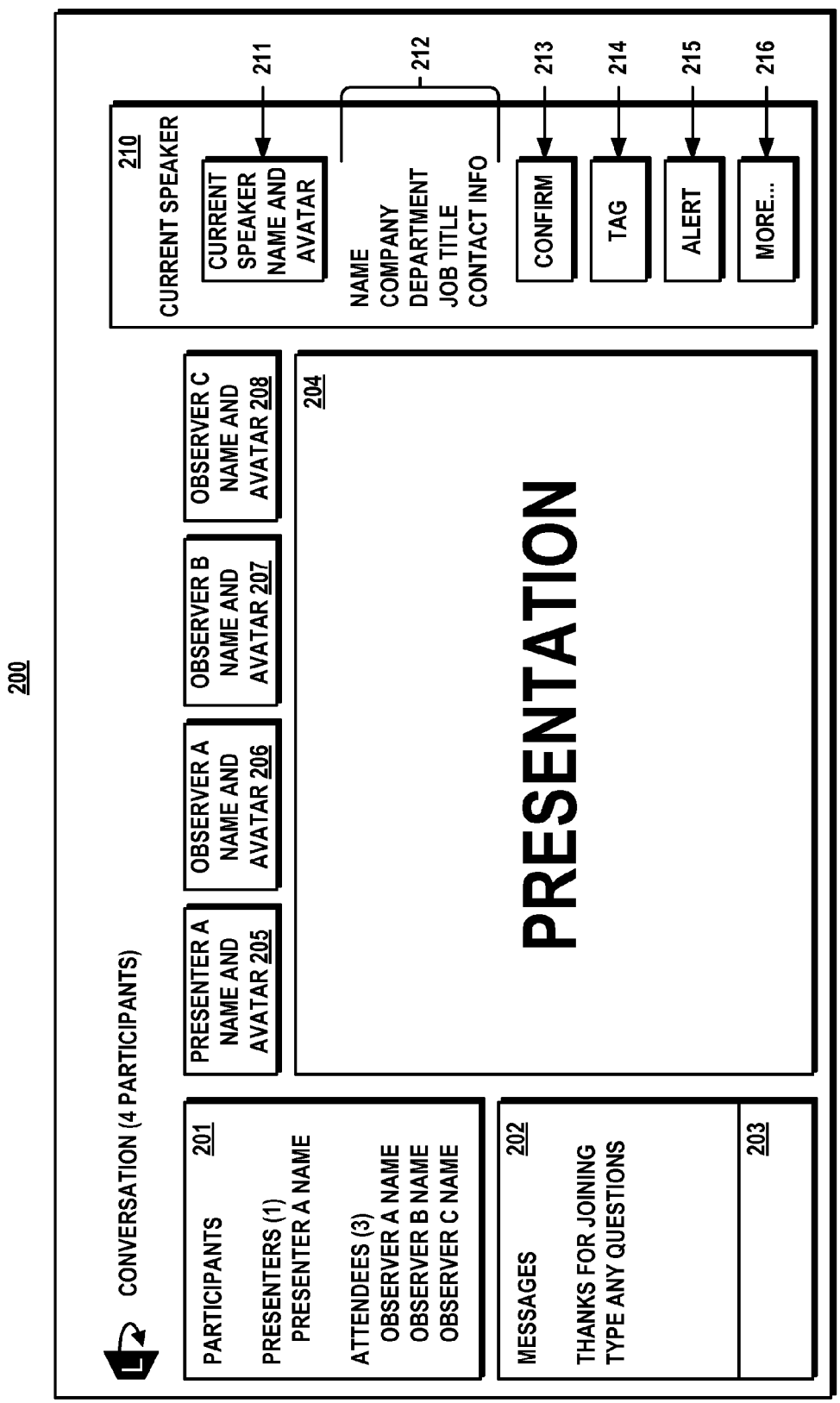

Referring to FIG. 2B with continuing reference to the foregoing figures, user interface 200 may be displayed in an exemplary situation in which Presenter A is speaking and audio data representing speech of Presenter A is communicated by client device 105 (e.g., landline telephone, conferencing speakerphone, etc.) to computer system 110 in real time. In this exemplary situation, user interface 200 may be displayed by each of client devices 101-104 or only by client devices 102-104 which are being used by participants other than Presenter A.

Computer system 110 may receive and process the audio data representing speech of Presenter A to generate an audio fingerprint for Presenter A. Computer system 110 may perform automated speaker recognition by comparing the audio fingerprint for Participant A against stored audio fingerprints contained in one or more of speaker fingerprint repository 112, directory 113, and/or participant data storage 114. In this exemplary situation, computer system 110 successfully recognizes Presenter A based the audio fingerprint created for Presenter A and a stored audio fingerprint and retrieves a name or identity (e.g., name or username of Presenter A) from metadata associated with the stored audio fingerprint.

Computer system 110 also retrieves organizational information including a name, company, a department, a job title, contact information, and an avatar or reference to an avatar for Presenter A from directory 113 or other information source. Computer system 110 augments the audio data (e.g., input audio stream) that represents speech of Presenter A with metadata that includes the name or identity and organizational information of Presenter A and communicates augmented audio data (e.g., synchronized streams of audio data and metadata) in real time to client devices 101-104 or only to client devices 102-104.

Upon receiving augmented audio data from computer system 110, one or more of client devices 101-104 may render the audio to hear the speech of Presenter A while simultaneously displaying the metadata that that identifies Presenter A and includes the organizational information of Presenter A. As shown, user interface 200 may display a current speaker box 210 that presents a current speaker name and avatar 211 which, in this case, presents the name and avatar of Presenter A. Current speaker name and avatar 211 may be included and/or referenced in the metadata or may be retrieved from directory 113 or other information source using a name or identity included in the metadata. Current speaker box 210 also presents organizational information 212 from the metadata which, in this case, includes the name, company, department, job title, and contact information of Presenter A.

Current speaker box 210 displays a confirm button 213, which can be clicked or touched by a participant to confirm that the current speaker has been correctly recognized. Upon receiving confirmation that Presenter A has been correctly identified as the current speaker, the stored audio fingerprint for Presenter A may be enhanced using the generated audio fingerprint of Presenter A and/or other audio data that represents speech of Presenter A. Current speaker box 210 also displays a tag button 214, which can be clicked or touched by a participant to provide a corrected name or identity for a current speaker who has been incorrectly identified.

As shown, current speaker box 210 presents an alert button 215, which can be clicked or touched by a participant component 120 to receive audible and/or visual alerts whenever Presenter A is currently speaking. For instance, if Presenter A stops speaking and another participant talks, an alert may be generated when Presenter A resumes speaking.

Current speaker box 210 also displays a more button 216, which can be clicked or touched by a participant component 120 to present further information and/or perform additional actions. For example, more button 216 may provide access to documents or other types of content that are contextually related to Presenter A and/or may enable audio data representing speech of Presenter A to be rendered louder relative to other speakers.

Augmented audio data including metadata that identifies Presenter A may be used to identify Presenter A as the current speaker and also may be stored by computer system 110 and/or used to generate a textual transcription of the online meeting. Augmented audio data and textual transcripts maintained by computer system 110 may be searched and/or filtered to provide portions that represent speech of Presenter A.

Additionally, in this example, computer system 110 recognizes Presenter A based on audio data received from client device 105 (e.g., landline telephone, conferencing speakerphone, etc.) and modifies and/or communicates data to modify the display of user interface 200. As shown, user interface 200 may be modified to indicate that the online meeting includes four detected participants based on computer system 110 determining that Presenter A is using both client device 101 and client device 105. Participants box 201 also may be changed to remove the telephone number of client device 105 and the indication that a guest is present. The telephone number of client device 105 and generic avatar 209 also may be removed from user interface 200. In FIG. 2B, user interface 200 still does not provide names or avatars for Presenter B and Presenter C who have not spoken and did not individually supply account information to join the online meeting.

Figure 2C:
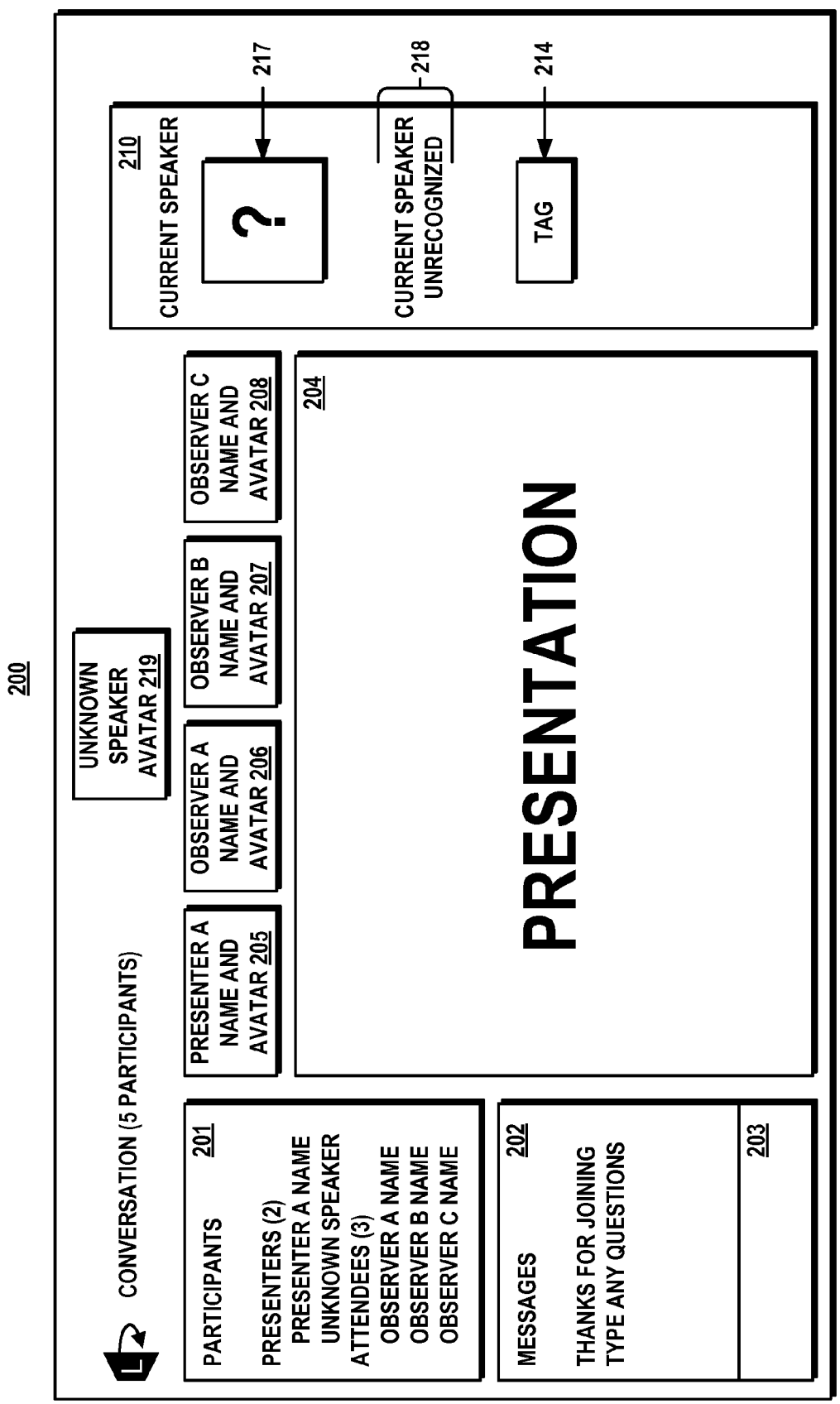

Referring to FIG. 2C with continuing reference to the foregoing figures, user interface 200 may be displayed in an exemplary situation where Presenter B is speaking and audio data representing speech of Presenter B is communicated to computer system 110 in real time. Presenter B may use client device 101 implemented as desktop computer or other suitable device or may use client device 105 (e.g., landline telephone, conferencing speakerphone, etc.), which are being shared by Presenters A-C. In this exemplary situation, user interface 200 may be displayed by each of client devices 101-104 or only by client devices 102-104 which are being used by participants other than Presenter B.

Computer system 110 may receive and process the audio data representing speech of Presenter B to generate an audio fingerprint for Presenter B. Computer system 110 may perform automated speaker recognition by comparing the audio fingerprint for Participant B against stored audio fingerprints contained in one or more of speaker fingerprint repository 112, directory 113, and/or participant data storage 114. In this exemplary situation, computer system does not maintain a stored audio fingerprint for Presenter B and does not recognize the current speaker.

Computer system 110 modifies and/or communicates data to modify the display of user interface 200 to indicate that the current speaker is unrecognized. User interface 200 may display current speaker box 210 that presents a graphic 217 and a message 218 indicating that the current speaker is unrecognized. Current speaker box 210 also displays tag button 214, which can be clicked or touched by a participant to provide a name or identity for the unrecognized speaker.

Also as shown, user interface 200 may be modified to indicate that the online meeting includes five detected participants based on computer system 110 detecting a new speaker. Participants box 201 may be changed to add an unknown speaker to the list of participants and presenters, and/or an unknown speaker avatar 219 may be added in user interface 200.

Figure 2D:
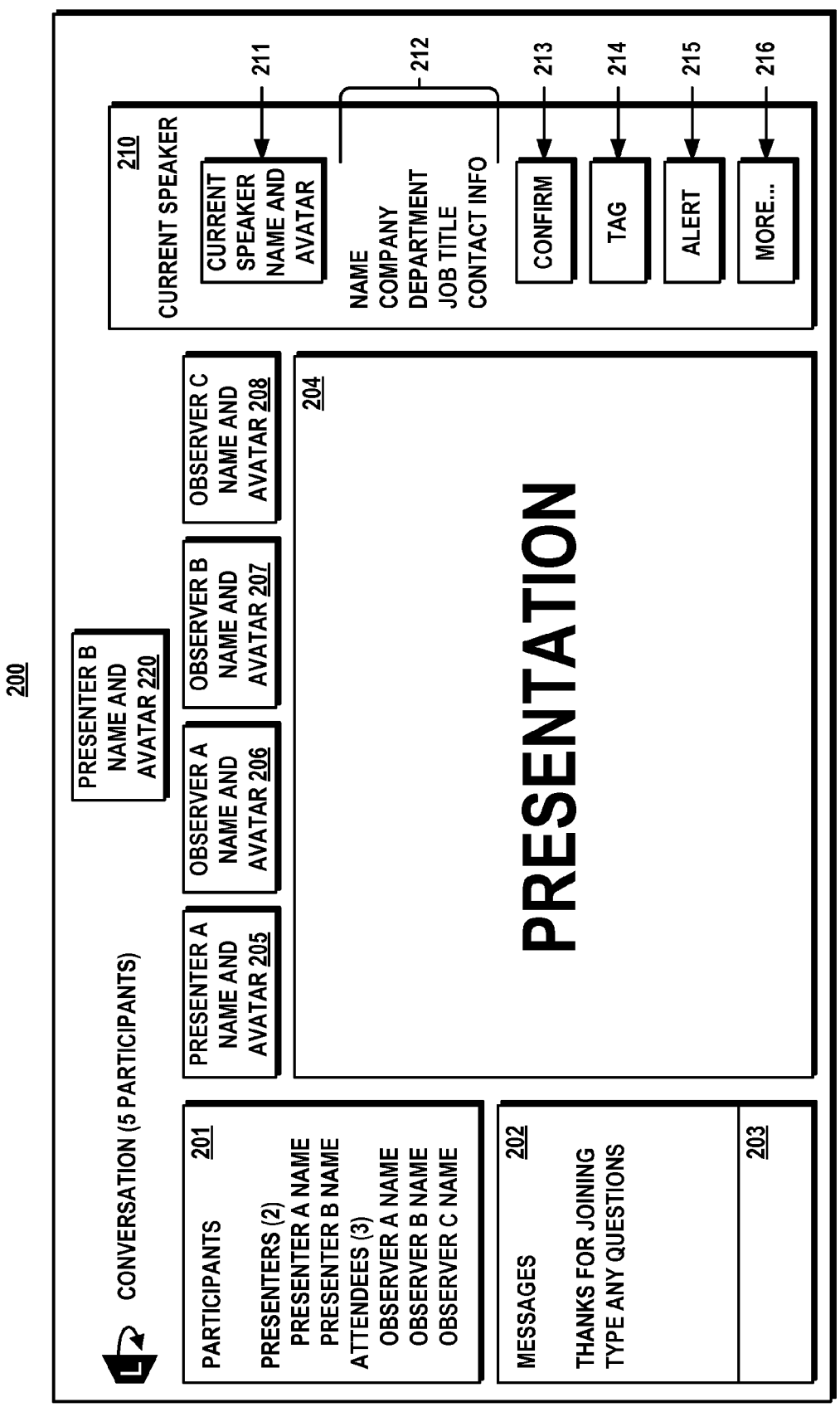

Referring to FIG. 2D with continuing reference to the foregoing figures, user interface 200 may be displayed in an exemplary situation where Presenter B is speaking and computer system 110 receives conflicting tagging information from client devices 102-104. For example, Observer A and Observer B may supply tagging information that identifies Presenter B while Observer C supplies tagging information that identifies Presenter C. In this exemplary situation, user interface 200 may be displayed by each of client devices 101-104 or only by client devices 102-104 which are used by participants other than Presenter B.

Computer system 110 recognizes the current speaker as Presenter B based on a majority rule or other suitable heuristic to resolve the conflicting tagging information. Computer system 110 identifies Presenter B using the tagging information (e.g., name or username of Presenter B) and retrieves organizational information including a name, company, a department, a job title, contact information, and an avatar or reference to an avatar for Presenter B from directory 113 or other information source. Computer system 110 augments the audio data (e.g., input audio stream) that represents speech of Presenter B with metadata that includes the name or identity and organizational information of Presenter B and communicates augmented audio data (e.g., synchronized streams of audio data and metadata) in real time to client devices 101-104 or only to client devices 102-104.

Upon receiving augmented audio data from computer system 110, one or more of client devices 101-104 may render the audio to hear the speech of Presenter B while simultaneously displaying the metadata that that identifies Presenter B and includes the organizational information of Presenter B. As shown, user interface 200 may display a current speaker box 210 that presents a current speaker name and avatar 211 which, in this case, presents the name and avatar of Presenter B. Current speaker name and avatar 211 may be included and/or referenced in the metadata or may be retrieved from directory 113 or other information source using a name or identity included in the metadata. Current speaker box 210 also presents organizational information 212 from the metadata which, in this case, includes the name, company, department, job title, and contact information of Presenter B.

Current speaker box 210 displays confirm button 213, which can be clicked or touched by a participant to confirm that the current speaker has been correctly recognized. Upon receiving confirmation that Presenter B has been correctly identified as the current speaker, the generated audio fingerprint for Presenter B may be stored in one or more of speaker fingerprint repository 112, directory 113, and/or participant data storage 114. Current speaker box 210 also displays tag button 214, which can be clicked or touched by a participant to provide a corrected name or identity for a current speaker who has been incorrectly identified.

As shown, current speaker box 210 presents an alert button 215, which can be clicked or touched by a participant component 120 to receive audible and/or visual alerts whenever Presenter B is currently speaking. For instance, if Presenter B stops speaking and another participant talks, an alert may be generated when Presenter B resumes speaking.

Current speaker box 210 also displays more button 216, which can be clicked or touched by a participant component 120 to present further information and/or perform additional actions. For example, more button 216 may provide access to documents or other types of content that are contextually related to Presenter B and/or may enable audio data representing speech of Presenter B to be rendered louder relative to other speakers.

Augmented audio data including metadata that identifies Presenter B may be used to identify Presenter B as the current speaker and also may be stored by computer system 110 and/or used to generate a textual transcription of the online meeting. Augmented audio data and textual transcripts maintained by computer system 110 may be searched and/or filtered to provide portions that represent speech of Presenter B and/or Presenter A, who was previously recognized by computer system 110.

Additionally, in this example, computer system 110 modifies or communicates data to modify the display of user interface 200. As shown, participants box 201 may be changed to add the name of Presenter B to the list of participants and presenters based on computer system 110 recognizing Presenter B. Also, Presenter B name and avatar 220 may replace unknown speaker avatar 219 in user interface 200.

After computer system 110 stores an audio fingerprint for Presenter B, user interface 200 shown in FIG. 2D also may be displayed in response to computer system 110 receiving subsequent audio data that represents speech of Presenter A or Presenter B. For example, if Presenter B stops speaking and Presenter A talks, computer system 110 may receive subsequent audio data that represents speech of Presenter A, generate a new audio fingerprint of Presenter A based on the subsequent audio data, and successfully perform automated speaker recognition by comparing the new audio fingerprint of Presenter A against the stored audio fingerprint of Presenter A. While Presenter A is talking, the user interface shown in FIG. 2D may be displayed with current speaker name and avatar 211 showing the name and avatar of Presenter A and with organizational information 212 showing the name, company, department, job title, and contact information of Presenter A.

Likewise, when Presenter B resumes speaking, computer system 110 may receive subsequent audio data that represents speech of Presenter B, generate a new audio fingerprint of Presenter B based on the subsequent audio data, and successfully perform automated speaker recognition by comparing the new audio fingerprint of Presenter B against the stored audio fingerprint of Presenter B. When Presenter B resumes speaking, the user interface shown in FIG. 2D may be displayed with current speaker name and avatar 211 showing the name and avatar of Presenter B and with organizational information 212 showing the name, company, department, job title, and contact information of Presenter B.

It also can be appreciated that user interface 200 shown in FIG. 2D still does not provide a name or avatar for Presenter C who has not spoken and did not individually supply account information to join the online meeting. When Presenter C eventually speaks, computer system 110 may recognize Presenter C, communicate metadata that identifies Presenter C, and/or modify or communicate data to modify user interface 200 for identifying Presenter C in a manner similar to the manner described above with respect to co-located Presenter B.

Populating Fingerprint Repository

Computer system 110 may populate speaker fingerprint repository 112 with stored audio fingerprints in various ways. In some implementations, computer system 110 may populate speaker fingerprint repository 112 with audio fingerprints by employing an offline or online training process. For instance, computer system 110 may request a participant to speak predefined sentences, create audio fingerprints for the participant based on audio data representing the spoken sentences, and store an audio fingerprint for the participant in speaker fingerprint repository 112 for use during one or more multi-party communications sessions. Computer system 110 may request participants to perform the training process to create an audio fingerprint offline before a multi-party communications session or online during a multi-party communications session. For example, computer system 110 may determine whether speaker fingerprint repository 112 contains a stored audio fingerprint for each participant that joins a multi-party communications and may request participants who do not have a stored audio fingerprint to create an audio fingerprint.

Alternatively or additionally, computer system 110 may populate speaker fingerprint repository 112 with stored audio fingerprints by employing a crowdsourcing process. For example, computer system 110 may employ a crowdsourcing process to populate speaker fingerprint repository 112 with stored audio fingerprints by creating an audio fingerprint for a current speaker and requesting one or more of client devices 101-104 to provide tagging information in the event that speaker fingerprint repository does not contain a stored audio fingerprint for the current speaker. Upon receiving tagging information identifying the current speaker and/or confirmation of the identity of the current speaker, computer system 110 may store the audio fingerprint for the current speaker and metadata that identifies the current speaker in one or more of speaker fingerprint repository 112, directory 113, or participant data storage 114 for use during a current multi-party communications session or a subsequent multi-party communications session. Tagging component 121 may facilitate the crowdsourcing process and allow speaker recognition even in the absence of a stored audio fingerprint for the current speaker in speaker fingerprint repository 112.

Computer system 110 also may employ a crowdsourcing process to populate speaker fingerprint repository 112 with stored audio fingerprints by requesting client devices 101-104 to provide local audio fingerprints for participants. When participants join a multi-party communications session, for instance, computer system 110 may request permission from the participants to access or receive a local audio fingerprint, local metadata, or other information from corresponding client devices 101-104 to facilitate speaker recognition. A local audio fingerprint for a participant that is received by computer system 110 may be stored with metadata for the participant in one or more of speaker fingerprint repository 112, directory 113, or participant data storage 114 for use during a current multi-party communications session or a subsequent multi-party communications session.

Audio/Video Speaker Recognition

Figure 3:
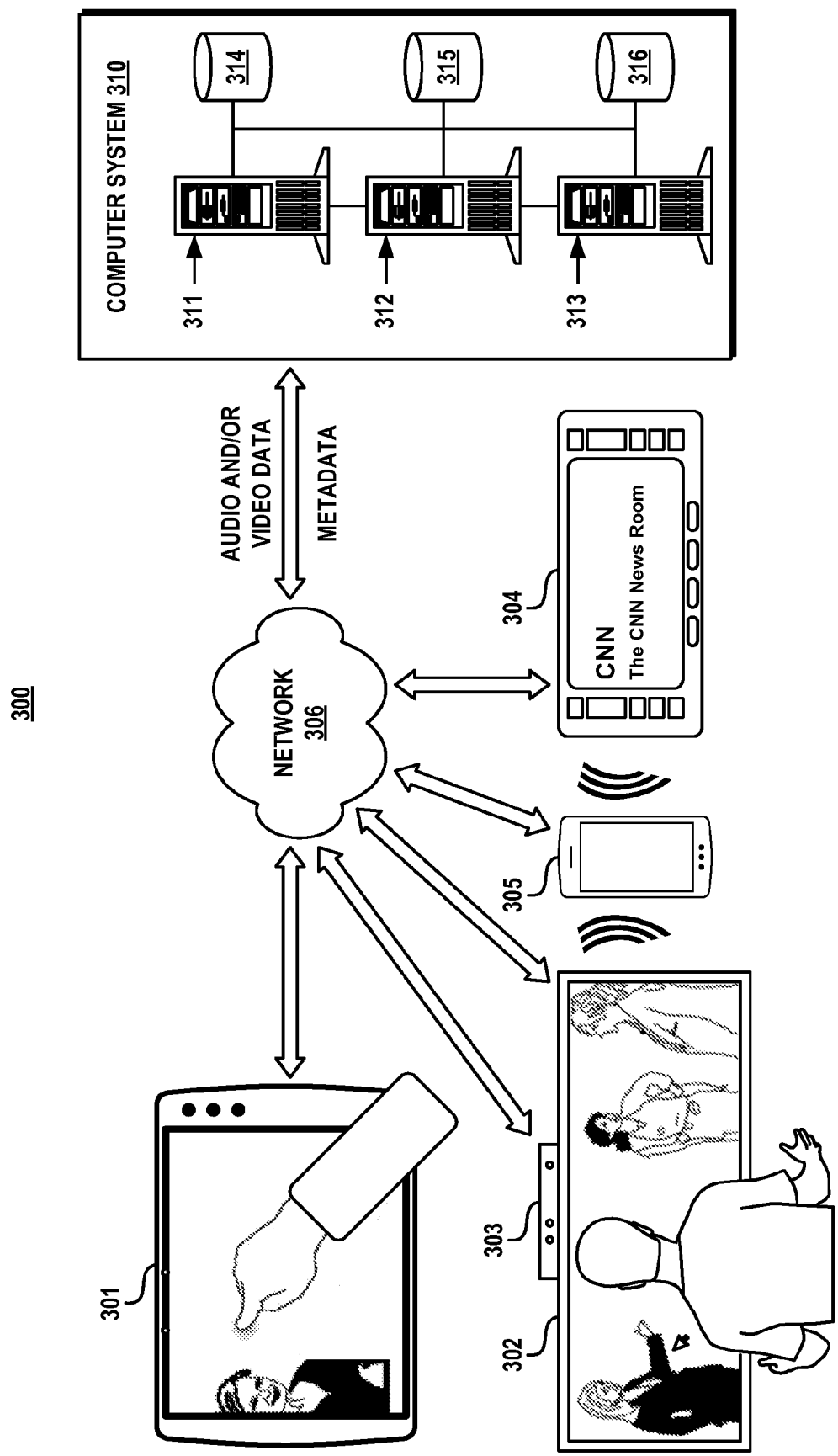
FIG. 3 illustrates an embodiment of an exemplary operating environment in accordance with aspects of the described subject matter.

FIG. 3 illustrates an operating environment 300 as an embodiment of an exemplary operating environment that may implement aspects of the described subject matter. It is to be appreciated that aspects of the described subject matter may be implemented by various types of operating environments, computer networks, platforms, frameworks, computer architectures, and/or computing devices.

Operating environment 300 may be implemented by one or more computing devices, one or more computer systems, and/or computer-executable instructions configured to perform various steps, methods, and/or functionality in accordance with aspects of the described subject matter. As shown, operating environment 100 may include client devices 301-305 implemented, for example, by various types of computing devices suitable for performing operations in accordance with aspects of the described subject matter. In various implementations, client devices 301-305 may communicate over a network 106 with each other and/or with a computer system 110. Network 306 may be implemented by any type of network or combination of networks described above.

Computer system 310 may be implemented by one or more computing devices such as server computers 311-313 (e.g., web servers, front end servers, application servers, database servers (e.g., SQL servers), domain controllers, domain name servers, directory servers, etc.) configured to provide various types of services and/or data stores in accordance with the described subject matter. Computer system 310 may include data stores 314-316 (e.g., databases, cloud storage, table storage, blob storage, file storage, queue storage, etc.) that are accessible to server computers 311-313 and configured to store various types of data in accordance with the described subject matter.

Computer system 310 may be implemented as a distributed computing system and/or may provide hosted and/or cloud-based services. Components of computer system 310 may be implemented by software, hardware, firmware or a combination thereof. For example, computer system 310 may include components implemented by computer-executable instructions that are stored on one or more computer-readable storage media and that are executed to perform various steps, methods, and/or functionality in accordance with aspects of the described subject matter. In various implementations, server computers 311-313 and data stores 314-316 of computer system 310 may provide some or all of the components described above with respect to computer system 110 shown in FIG. 1.

In implementations where user-related data is utilized, providers (e.g., client devices 301-305, applications, etc.) and consumers (e.g., computer system 310, web service, cloud-based service, etc.) of such user-related data may employ a variety of mechanisms in the interests of user privacy and information protection. Such mechanisms may include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

In accordance with aspects of the described subject matter, one or more of client devices 301-305 and/or computer system 310 may perform various operations involved with analyzing audio or video data and communicating metadata that identifies a current speaker.

In various implementations, one or more of client devices 301-305 may be used by an observer to render audio and/or video content that represents a current speaker. Exemplary types of audio and/or video content may include, without limitation: real time audio and/or video content, prerecorded audio and/or video content, an audio and/or video stream, television content, radio content, podcast content, web content, and/or other audio and/or video data that represents a current speaker.

Client devices 301-305 may present and/or computer system 310 may provide various user interfaces for allowing an observer to interact with rendered audio and/or video content. User interfaces may be presented by client devices 301-305 via a web browsing application or other suitable type of application, application program, and/or app that provides a user interface for rendering audio and/or video content. Client devices 301-305 may receive and respond to various types of user input such as voice input, touch input, gesture input, remote control input, button input, and so forth.

One or more of client devices 301-305 may include hardware and software for providing or supporting speaker recognition. For example, an application running on one or more client devices 301-305 may be configured to interpret various types of input as a request to identify a current speaker. Such application may implemented as an audio and/or video application that presents content and provides speaker recognition functionality and/or by a separate speaker recognition application that runs in conjunction with an audio and/or video application that presents content. Speaker recognition functionality may include one or more of: receiving a request to identify the current speaker, capturing audio and/or video content speech, providing audio and/or video data to computer system 310, providing descriptive metadata that facilitates speaker recognition, communicating metadata that identifies a current speaker, and/or receiving, storing, and using an audio fingerprint for a current speaker.

As shown in FIG. 3, client device 301 may be a tablet device that is being used by an observer to present and view video content. The observer may interact with video content at various times when the video content shows a current speaker. For instance, the observer may tap a touch-sensitive display screen, tap a particular area of a user interface that is displaying a current speaker, tap an icon or menu item, press a button, and so forth. Client device 301 and/or an application running on client device 301 may receive and interpret touch input from the observer as a request to identify the current speaker. Alternatively or additionally, the observer may speak a voice command (e.g., "who is speaking," "identify speaker," etc.) that can be interpreted by client device 301 and/or an application running on client device 301 as a request to identify the current speaker.

Client device 302 and client 303 respectively may be a television and media device (e.g., media and/or gaming console, set-top box, etc.) being used by an observer to present and view video content. The observer may interact with video content that shows a current speaker by using gestures, a remote control, and/or other suitable input device to move a cursor, select a particular area of a user interface that is displaying a current speaker, select an icon or menu item, select a button, and so forth. Client device 302, client device 303, and/or an application running on client device 302 and/or client device 303 may receive and interpret input from the observer as a request to identify the current speaker. Alternatively or additionally, the observer may speak a voice command that can be interpreted by client device 302, client device 303, and/or an application running on client device 302 and/or client device 303 as a request to identify the current speaker.

Client device 304 may be implemented as a radio being used by an observer to listen to audio content. An observer may interact with client device 304 and/or an application running on client device 304 using various types of input (e.g., touch input, button input, voice input, etc.) to request identification of a current speaker. It can be appreciated that client device 304 may be implemented by other types of audio devices such as a speakerphone, a portable media player, an audio device for use by an individual having a visual impairment, and/or other suitable audio device.

Client device 305 may be implemented as a smartphone being used by an observer to provide audio and/or video content. In some implementations, an observer may interact with client device 305 and/or an application running on client device 305 using various types of input (e.g., touch input, button input, voice input, etc.) to request identification of a current speaker when audio and/or video content is rendered by client device 305. Alternatively, an observer may interact with client device 305 and/or an application running on client device 305 to request identification of a current speaker when audio and/or video content is rendered by a different client device such as client device 302 or client device 304. For example, a speaker recognition application may be launched on client device 305 to identify a current speaker presented in external audio content detected by client device 305.

In response to receiving a request to identify a current speaker, any of client devices 301-305 and/or an application running on any of client device 301 may capture and communicate a sample of audio and/or video data that represents the current speaker to computer system 310 for processing. In some implementations, one or more of client devices 301-305 and/or an application running on one or more of client devices 301-305 also may detect, generate, and/or communicate descriptive metadata that facilitates speaker recognition such as a title of the video content, a date of time of a broadcast, a timestamp when the current speaker is being shown, an image or image features of the current speaker, and/or other descriptive information.

Upon receiving the sample of audio and/or video data, computer system 310 may generate an audio fingerprint for the current speaker and compare the audio fingerprint for the current speaker against stored audio fingerprints maintained by computer system 310. Descriptive metadata, if received by computer system 310, may be compared with metadata associated with stored audio fingerprints to facilitate speaker recognition by identifying stored audio fingerprints as candidates and/or matching a stored audio fingerprint to the audio fingerprint for the current speaker.

If computer system 310 successfully recognizes the current speaker based on a stored audio fingerprint, computer system 310 may retrieves a name or identity of the current speaker from metadata associated with the stored audio fingerprint. Computer system 310 also may retrieve additional information (e.g., personal and/or professional information, organizational information, directory information, profile information, etc.) for the current speaker from one or more information sources. Computer system 310 may communicate metadata that identifies the current speaker including the additional information for display by one or more of client devices 301-305 while presenting the audio and/or video content. In some implementations, computer system 310 may be providing (e.g., broadcasting, streaming, etc.) the audio and/or video content for display by one or more of client devices 301-105 and may augment the audio and/or video data with the metadata and communicate augmented audio and/or video data as synchronized streams in real time to one or more of client devices 301-105.

Upon receiving the metadata and/or augmented audio and/or video data from computer system 310, one or more of client devices 301-105 may render audio and/or video content while simultaneously displaying the metadata that identifies the current speaker and/or includes the additional information for the current speaker. In some implementations, computer system 310 may communicate an audio fingerprint for the current speaker to one or more of client devices 301-105 for storage and use by such client devices to identify the current speaker in subsequent audio and/or video content. An audio fingerprint for the current speaker that is received from computer system 310 may be shared by an observer among client devices 301-305 and/or with other users.

The metadata that that identifies the current speaker and/or the additional information for the current speaker may be displayed by one or more of client devices 301-305 as an indicator within a user interface that renders audio and/or video content, as a separate user interface, and/or in various other ways. The indicator may present buttons or other display elements to confirm the identity of the current speaker, request an alert whenever the current speaker is detected, present further content related to the current speaker, and/or perform additional actions.

In situations where computer system 310 does not maintain a stored audio fingerprint for current speaker and/or speaker recognition is unsuccessful, computer system 310 may communicate a list of candidates or possible speakers and may request the observer to supply tagging information by selecting a possible speaker and/or inputting a name or other suitable identity of the unrecognized speaker. For example, computer system 310 may generate and communicate a list of possible speakers based on descriptive metadata received from one or more of client devices 301-305 and/or an application running on one or more of client devices 301-305. Alternatively or additionally, computer system 310 may communicate a request for tagging information to one or more users (e.g., a community of users, a subset of users, etc.) who, in some cases, may be simultaneously rendering the audio and/or video content. If conflicting tagging information (e.g., different names) for the current speaker is supplied, computer system 310 may identify the current speaker based on an identity supplied by a majority of users or other suitable heuristic to resolve the conflict.

Upon receiving tagging information identifying the current speaker, computer system 310 may associate metadata that identifies the current speaker with generated audio fingerprint of the current speaker. Computer system 310 may store the generated audio fingerprint for current speaker along with the associated metadata for use in subsequent speaker recognition and/or may supply the generated audio fingerprint and associated metadata to one or more client devices 301-305 for storage and use by such client devices to identify the current speaker in subsequent audio and/or video content.

Exemplary Process

With continuing reference to the foregoing figures, an exemplary process is described below to further illustrate aspects of the described subject matter. It is to be understood that the following exemplary process is not intended to limit the described subject matter to particular implementations.

Figure 4:
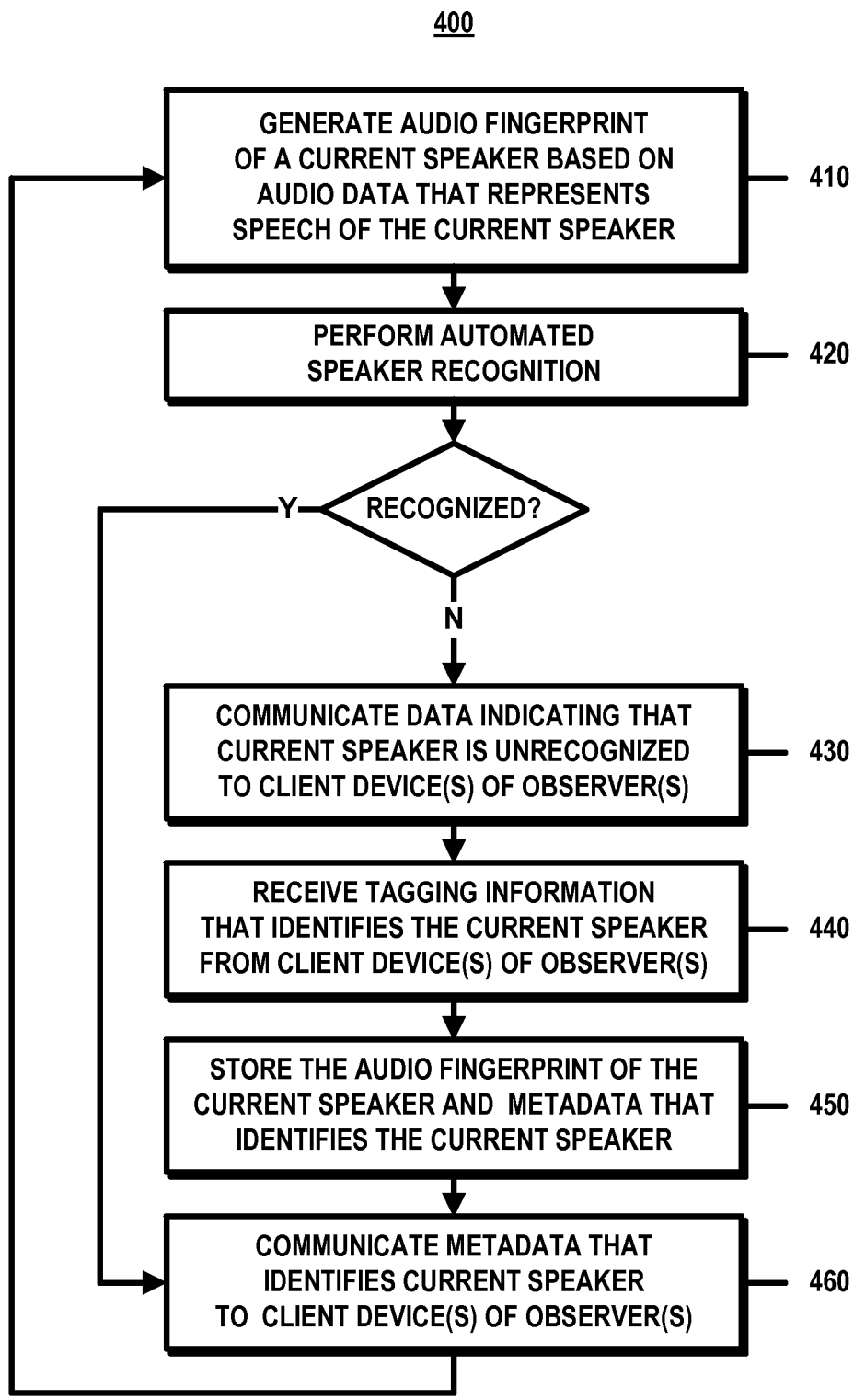
FIG. 4 illustrates an embodiment of an exemplary process in accordance with aspects of the described subject matter.

FIG. 4 illustrates a computer-implemented method 400 as an embodiment of an exemplary process in accordance with aspects of the described subject matter. In various embodiments, computer-implemented method 400 may be performed computer system 110, computer system 310, and/or other suitable computer system including one or more computing devices. It is to be appreciated that computer-implemented method 400, or portions thereof, may be performed by various computing devices, computer systems, components, and/or computer-executable instructions stored on one more computer-readable storage media.

At 410, a computer system may generate an audio fingerprint of a current speaker based on audio data that represents speech of a current speaker. For example, computer system 110 and/or computer system 310 may receive various types of audio and/or video data (e.g., real time audio and/or video data, prerecorded audio and/or video data, an audio and/or video stream, television content, radio content, podcast content, web content, and/or other types of audio and/or video data that represents a current speaker). Computer system 110 and/or computer system 310 may generate an audio fingerprint (e.g., voiceprint, voice biometric, speaker template, feature vector, set or sequence of feature vectors, speaker model, speaker codebook, and/or other suitable speaker fingerprint) based on features of the audio and/or video data.

At 420, the computer system may perform automated speaker recognition. For example, computer system 110 and/or computer system 310 may compare the generated audio fingerprint of the current speaker against stored audio fingerprints contained in one or more storage locations. Various speech features may be compared to match audio fingerprints. If the current speaker is successfully recognized based on a stored audio fingerprint, computer system 110 and/or computer system 310 may retrieve a name or other suitable identity of an individual associated the stored audio fingerprint and communicate metadata that identifies the current speaker.

At 430, the computer system may communicate data indicating that the current speaker is unrecognized to client device(s) of observers(s). For example, computer system 110 and/or computer system 310 may communicate data to present a message and/or graphic indicating that a speaker is unrecognized when automated speaker recognition is unsuccessful. Computer system 110 and/or computer system 310 also may request a remote participant or observer to supply tagging information such as a name or other suitable identity of the unrecognized speaker. In some implementations, a list of possible speakers may be presented to a remote participant or observer for selection.

At 440, the computer system may receive tagging information that identifies the current speaker from client device(s) of observer(s). For example, computer system 110 and/or computer system 310 may receive tagging information in response to one or more remote participants or observers manually inputting of a name or identity of the current speaker and/or selecting a name, user profile, and/or an avatar for current speaker. If conflicting tagging information (e.g., different names) for the current speaker is received, computer system 110 and/or computer system 310 may identify the current speaker based on an identity supplied by a majority of remote participants or observers.

At 450, the computer system may store the audio fingerprint of the current speaker and metadata that identifies the current speaker. For example, computer system 110 and/or computer system 310 may store the generated audio fingerprint of the current speaker that and metadata identifying the current speaker in one or more storage locations in response to receiving tagging information. In some implementations, the audio fingerprint of the current speaker and metadata that identifies the current speaker may be stored after receiving confirmation that the current speaker has been correctly identified from one or more remote participants or observers. The stored audio fingerprint of the current speaker may be used by computer system 110 and/or computer system 310 to perform speaker recognition when subsequent audio data that represents speech of the current speaker is received.

At 460, the computer system may communicate metadata that identifies the current speaker to client device(s) of observer(s). For example, computer system 110 and/or computer system 310 may communicate metadata that identifies the current speaker alone, in combination with various types of additional information (e.g., personal and/or professional information, organizational information, directory information, profile information, etc.), and/or as part of augmented audio data (e.g., synchronized audio data and metadata streams). The metadata that identifies the current speaker and/or includes the additional information may be rendered by a client device of a remote participant or observer within an indicator identifying the current speaker and/or user interface.

After 460, the computer system may repeat one or more operations. For example, example, computer system 110 and/or computer system 310 may generate a new audio fingerprint of the current speaker based on subsequent audio data that represents speech of the current speaker and perform automated speaker recognition. Computer system 110 and/or computer system 310 may successfully recognize the current speaker when the new audio fingerprint of the current speaker is compared against the stored audio fingerprint of the current speaker and may communicate metadata that identifies the current speaker to client device(s) of observer(s).

As described above, aspects of the described subject matter may provide various attendant and/or technical advantages. By way of illustration and not limitation, performing automated speaker recognition and communicating metadata that identifies a current speaker allows a remote participant of a multi-party communications session (e.g., audio, video, and/or web conference, online meeting, etc.) and/or observer to identify a current speaker at any given moment when communicating in real time via audio and/or video conferencing and/or otherwise rendering audio and/or video content.

Performing automated speaker recognition and communicating metadata that identifies a current speaker allows a participant of a multi-party communications session to identify a current speaker when multiple speakers are co-located and share a single client device and names and/or avatars that are displayed based on information supplied to join the online meeting are not provided for co-located participants who do not separately join the online meeting.

Performing automated speaker recognition and communicating metadata that identifies a current speaker allows a participant of a multi-party communications session to identify a current speaker who uses a telephone (e.g., landline telephone, conferencing speakerphone, mobile telephone, etc.) to dial into a multi-party communications session and/or as an additional device to join the multi-party communications session. Performing automated speaker recognition in such context also allows a user interface that presents the multi-party communications session to indicate that a single participant is using multiple client devices to communicate.

Communicating metadata allows a remote participant or observer to identify the current speaker and receive additional information (e.g., personal and/or professional information, organizational information, directory information, profile information, etc.) from data sources in real time to provide more value when having an online conversation and/or otherwise enhance the user experience.

Augmenting an audio stream with metadata allows alerts to be generated when a particular recognized speaker is talking, enables searching a real-time or stored audio stream for audio content of a recognized speaker, and/or facilitates creating and searching textual transcriptions of conversations having multiple speakers.

Communicating data indicating that the current speaker is unrecognized to a client device of an observer and receiving tagging information that identifies the current speaker from the client device of the observer allows a current speaker to be identified even in the absence of a stored audio fingerprint of the current speaker.

Communicating data indicating that the current speaker is unrecognized to a client device of an observer, receiving tagging information that identifies the current speaker from the client device of the observer, and storing the audio fingerprint of the current speaker and metadata that identifies the current speaker allows a fingerprint repository to be populated via a crowdsourcing process. Such crowdsourcing process allows automated speaker recognition to be performed in a speaker-independent and/or speech-independent manner and eliminates or reduces the need for a computer system to perform the computationally expensive process of training speaker models.

Exemplary Operating Environments

Aspects of the described subject matter may be implemented for and/or by various operating environments, computer networks, platforms, frameworks, computer architectures, and/or computing devices. Aspects of the described subject matter may be implemented by computer-executable instructions that may be executed by one or more computing devices, computer systems, and/or processors.

In its most basic configuration, a computing device and/or computer system may include at least one processing unit (e.g., single-processor units, multi-processor units, single-core units, and/or multi-core units) and memory. Depending on the exact configuration and type of computer system or computing device, the memory implemented by a computing device and/or computer system may be volatile (e.g., random access memory (RAM)), non-volatile (e.g., read-only memory (ROM), flash memory, and the like), or a combination thereof.

A computing device and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter may be implemented by computer-executable instructions stored on one or more computer-readable storage media. Computer-executable instructions may be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device may provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device may be configured to receive and respond to input in various ways depending upon implementation. Responses may be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network or combination of networks. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

A computing device may be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device may be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device may include and/or run one or more computer programs implemented, for example, by software, firmware, hardware, logic, and/or circuitry of the computing device. Computer programs may be distributed to and/or installed on a computing device in various ways. For instance, computer programs may be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device may include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device may include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device may include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system may be implemented by a computing device, such as a server computer, or by multiple computing devices configured to implement a service in which one or more suitably-configured computing devices may perform one or more processing steps. A computer system may be implemented as a distributed computing system in which components are located on different computing devices that are connected to each other through network (e.g., wired and/or wireless) and/or other forms of direct and/or indirect connections. A computer system also may be implemented via a cloud-based architecture (e.g., public, private, or a combination thereof) in which services are delivered through shared datacenters. Some components of a computer system may be disposed within a cloud while other components are disposed outside of the cloud.

Figure 5:
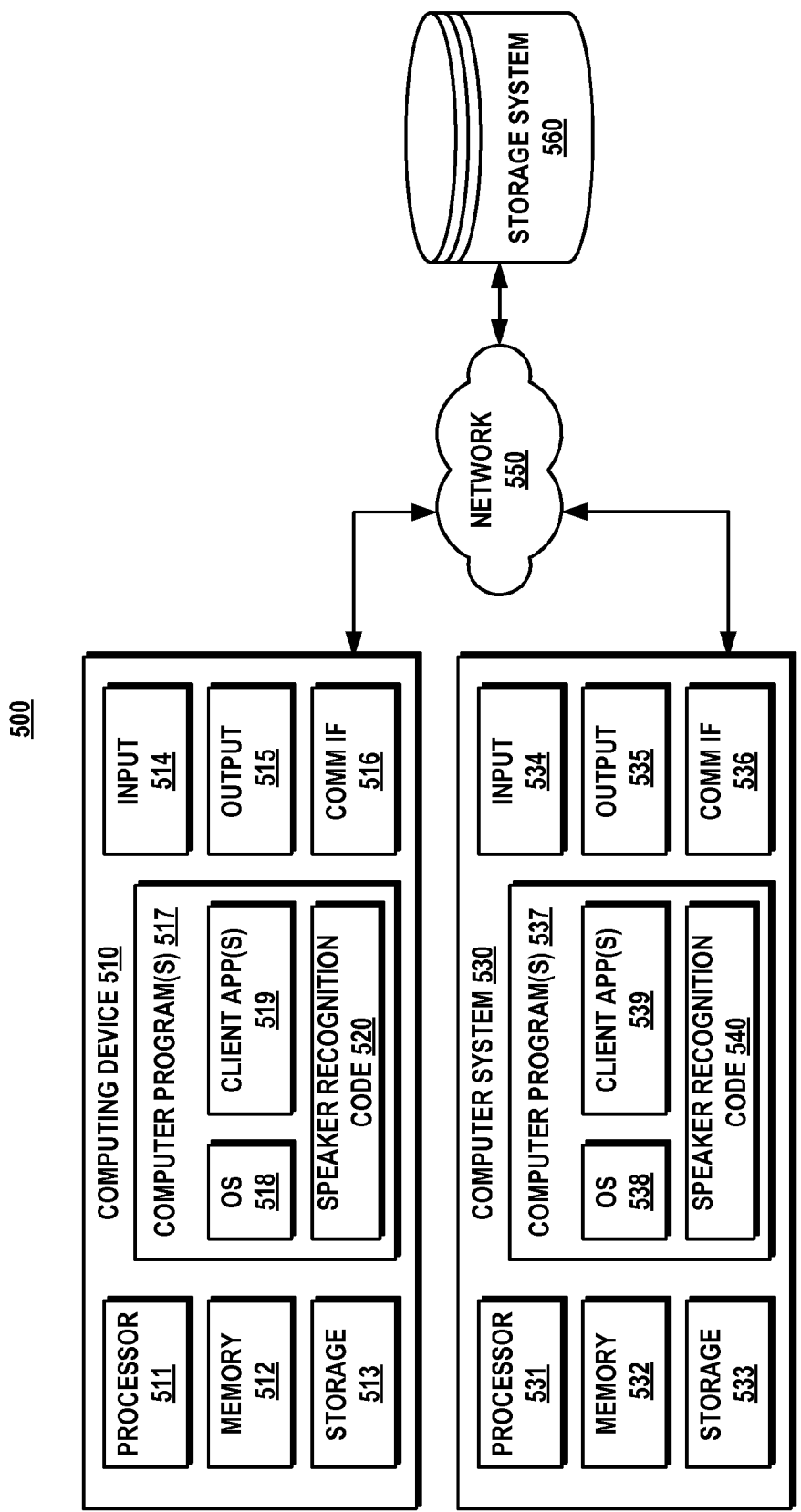
FIG. 5 illustrates an embodiment of an exemplary operating environment that may implement aspects of the described subject matter.

FIG. 5 illustrates an operating environment 500 as an embodiment of an exemplary operating environment that may implement aspects of the described subject matter. It is to be appreciated that operating environment 500 may be implemented by a client-server model and/or architecture as well as by other operating environment models and/or architectures in various embodiments.

Operating environment 500 may include a computing device 510, which may be implement aspects of the described subject matter. Computing device 510 may include a processor 511 and memory 512. Computing device 510 also may include additional hardware storage 513. It is to be understood that computer-readable storage media includes memory 512 and hardware storage 513.

Computing device 510 may include input devices 514 and output devices 515. Input devices 314 may include one or more of the exemplary input devices described above and/or other type of input mechanism and/or device. Output devices 515 may include one or more of the exemplary output devices described above and/or other type of output mechanism and/or device.

Computing device 510 may contain one or more communication interfaces 516 that allow computing device 510 to communicate with other computing devices and/or computer systems. Communication interfaces 516 also may be used in the context of distributing computer-executable instructions.

Computing device 510 may include and/or run one or more computer programs 517 implemented, for example, by software, firmware, hardware, logic, and/or circuitry of computing device 510. Computer programs 517 may include an operating system 518 implemented, for example, by one or more exemplary operating systems described above and/or other type of operating system suitable for running on computing device 510. Computer programs 517 may include one or more applications 519 implemented, for example, by one or more exemplary applications described above and/or other type of application suitable for running on computing device 510.

Computer programs 517 may be configured via one or more suitable interfaces (e.g., API or other data connection) to communicate and/or cooperate with one or more resources. Examples of resources include local computing resources of computing device 510 and/or remote computing resources such as server-hosted resources, cloud-based resources, online resources, remote data stores, remote databases, remote repositories, web services, web sites, web pages, web content, and/or other types of remote resources.

Computer programs 517 may implement computer-executable instructions that are stored in computer-readable storage media such as memory 512 or hardware storage 513, for example. Computer-executable instructions implemented by computer programs 517 may be configured to work in conjunction with, support, and/or enhance one or more of operating system 518 and applications 519. Computer-executable instructions implemented by computer programs 517 also may be configured to provide one or more separate and/or stand-alone services.

Computing device 510 and/or computer programs 517 may implement and/or perform various aspects of the described subject matter. As shown, computing device 510 and/or computer programs 517 may include speaker recognition code 520. In various embodiments, speaker recognition code 520 may include computer-executable instructions that are stored on a computer-readable storage medium and configured to implement one or more aspects of the described subject matter. By way of example, and without limitation, speaker recognition code 520 may be implemented by computing device 510 which, in turn, may represent one or more of client devices 101-104 and/or client devices 301-305. By way of further example, and without limitation, speaker recognition code 520 may be configured to present user interface 200.

Operating environment 500 may include a computer system 530, which may be implement aspects of the described subject matter. Computer system 530 may be implemented by one or more computing devices such as one or more server computers. Computer system 530 may include a processor 531 and memory 532. Computer system 530 also may include additional hardware storage 533. It is to be understood that computer-readable storage media includes memory 532 and hardware storage 533. Computer system 530 may include input devices 534 and output devices 535. Input devices 534 may include one or more of the exemplary input devices described above and/or other type of input mechanism and/or device. Output devices 535 may include one or more of the exemplary output devices described above and/or other type of output mechanism and/or device.

Computer system 530 may contain one or more communication interfaces 536 that allow computer system 530 to communicate with various computing devices (e.g., computing device 510) and/or other computer systems. Communication interfaces 536 also may be used in the context of distributing computer-executable instructions.

Computer system 530 may include and/or run one or more computer programs 537 implemented, for example, by software, firmware, hardware, logic, and/or circuitry of computer system 530. Computer programs 537 may include an operating system 538 implemented, for example, by one or more exemplary operating systems described above and/or other type of operating system suitable for running on computer system 530. Computer programs 537 may include one or more applications 539 implemented, for example, by one or more exemplary applications described above and/or other type of application suitable for running on computer system 530.

Computer programs 537 may be configured via one or more suitable interfaces (e.g., API or other data connection) to communicate and/or cooperate with one or more resources. Examples of resources include local computing resources of computer system 530 and/or remote computing resources such as server-hosted resources, cloud-based resources, online resources, remote data stores, remote databases, remote repositories, web services, web sites, web pages, web content, and/or other types of remote resources.

Computer programs 537 may implement computer-executable instructions that are stored in computer-readable storage media such as memory 532 or hardware storage 533, for example. Computer-executable instructions implemented by computer programs 537 may be configured to work in conjunction with, support, and/or enhance one or more of operating system 538 and applications 539. Computer-executable instructions implemented by computer programs 537 also may be configured to provide one or more separate and/or stand-alone services.

Computing system 530 and/or computer programs 537 may implement and/or perform various aspects of the described subject matter. As shown, computer system 530 and/or computer programs 537 may include speaker recognition code 540. In various embodiments, speaker recognition code 540 may include computer-executable instructions that are stored on a computer-readable storage medium and configured to implement one or more aspects of the described subject matter. By way of example, and without limitation, speaker recognition code 540 may be implemented by computer system 530 which, in turn, may implement computer system 110 and/or computer system 310. By way of further example, and without limitation, speaker recognition code 540 may implement one or more aspects of computer-implemented method 400.

Computing device 510 and computer system 530 may communicate over network 550, which may be implemented by any type of network or combination of networks suitable for providing communication between computing device 510 and computer system 530. Network 550 may include, for example and without limitation: a WAN such as the Internet, a LAN, a telephone network, a private network, a public network, a packet network, a circuit-switched network, a wired network, and/or a wireless network. Computing device 510 and computer system 530 may communicate over network 550 using various communication protocols and/or data types. One or more communication interfaces 516 of computing device 510 and one or more communication interfaces 536 of computer system 530 may by employed in the context of communicating over network 550.

Computing device 510 and/or computer system 530 may communicate with a storage system 560 over network 550. Alternatively or additionally, storage system 560 may be integrated with computing device 510 and/or computer system 530. Storage system 560 may be representative of various types of storage in accordance with the described subject matter. For example, storage system 560 may implement one or more of: speaker fingerprint repository 112, directory 113, participant data storage 114, enriched audio data repository 116, transcription repository 118, and/or other data storage facility in accordance with the described subject matter. Storage system 560 may provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 560 may be implemented by one or more computing devices, such as a computer cluster in a datacenter, by virtual machines, and/or provided as a cloud-based storage service.

Figure 6:
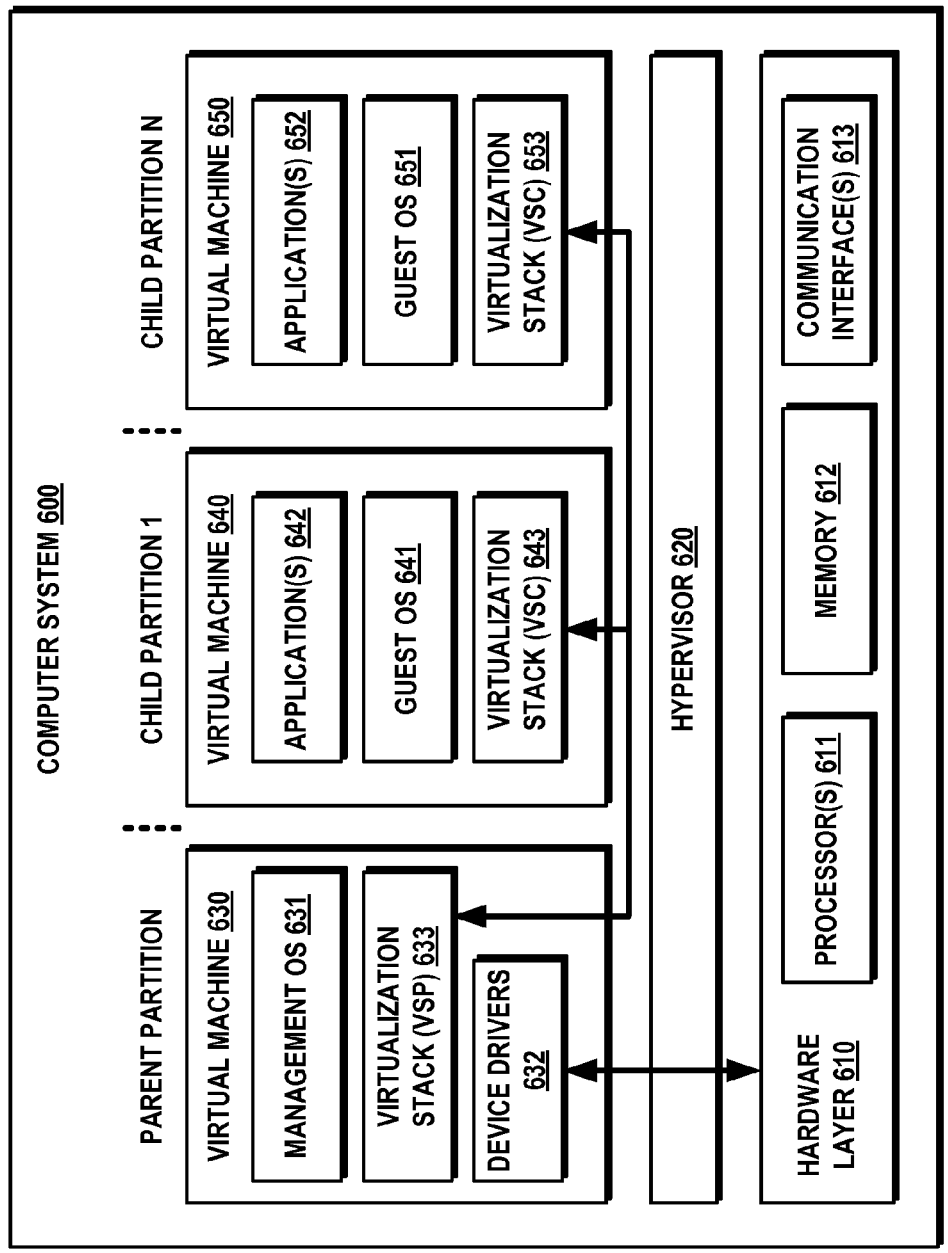
FIG. 6 illustrates an embodiment of an exemplary computer system that may implement aspects of the described subject matter.

FIG. 6 illustrates a computer system 600 as an embodiment of an exemplary computer system that may implement aspects of the described subject matter. In various implementations, deployment of computer system 600 and/or multiple deployments thereof may provide server virtualization for concurrently running multiple virtual servers instances on one physical host server computer and/or network virtualization for concurrently running multiple virtual network infrastructures on the same physical network.

Computer system 600 may be implemented by various computing devices such as one or more physical server computers that provide a hardware layer 610 which may include processor(s) 611, memory 612, and communication interface(s) 613. Computer system 600 may implement a hypervisor 620 configured to manage, control, and/or arbitrate access to hardware layer 610. In various implementations, hypervisor 620 may manage hardware resources to provide isolated execution environments or partitions such a parent (root) partition and one or more child partitions. A parent partition may operate to create one or more child partitions. Each partition may be implemented as an abstract container or logical unit for isolating processor and memory resources managed by hypervisor 620 and may be allocated a set of hardware resources and virtual resources. A logical system may map to a partition, and logical devices may map to virtual devices within the partition.

Parent and child partitions may implement virtual machines such as virtual machines 630, 640, and 650, for example. Each virtual machine may emulate a physical computing device or computer system as a software implementation that executes programs like a physical machine. Each virtual machine can have one or more virtual processors and may provide a virtual system platform for executing an operating system (e.g., a Microsoft® operating system, a Google® operating system, an operating system from Apple®, a Linux® operating system, an open source operating system, etc.). As shown, virtual machine 630 in parent partition may run a management operating system 631, and virtual machines 640, 650 in child partitions may host guest operating systems 641, 651 each implemented, for example, as a full-featured operating system or a special-purpose kernel. Each of guest operating systems 641, 651 can schedule threads to execute on one or more virtual processors and effectuate instances of application(s) 642, 652, respectively.

Virtual machine 630 in parent partition may have access to hardware layer 610 via device drivers 632 and/or other suitable interfaces. Virtual machines 640, 650 in child partitions, however, generally do not have access to hardware layer 610. Rather, such virtual machines 640, 650 are presented with a virtual view of hardware resources and are supported by virtualization services provided by virtual machine 630 in parent partition. Virtual machine 630 in parent partition may host a virtualization stack 633 that provides virtualization management functionality including access to hardware layer 610 via device drivers 632. Virtualization stack 633 may implement and/or operate as a virtualization services provider (VSP) to handle requests from and provide various virtualization services to a virtualization service client (VSC) implemented by one or more virtualization stacks 643, 653 in virtual machines 640, 650 that are operating in child partitions.

Computer system 600 may implement and/or perform various aspects of the described subject matter. By way of example, and without limitation, one or more virtual machines 640, 650 may implement a web service and/or cloud-based service having speaker recognition functionality. By way of further example, and without limitation, one or more virtual machines 640, 650 may implement one or more aspects of computer system 110, computer system 310, and/or computer-implemented method 400. In addition, hardware layer 610 may be implemented by one or more computing devices of computer system 110, computer system 310, and/or computer system 530.

Figure 7:
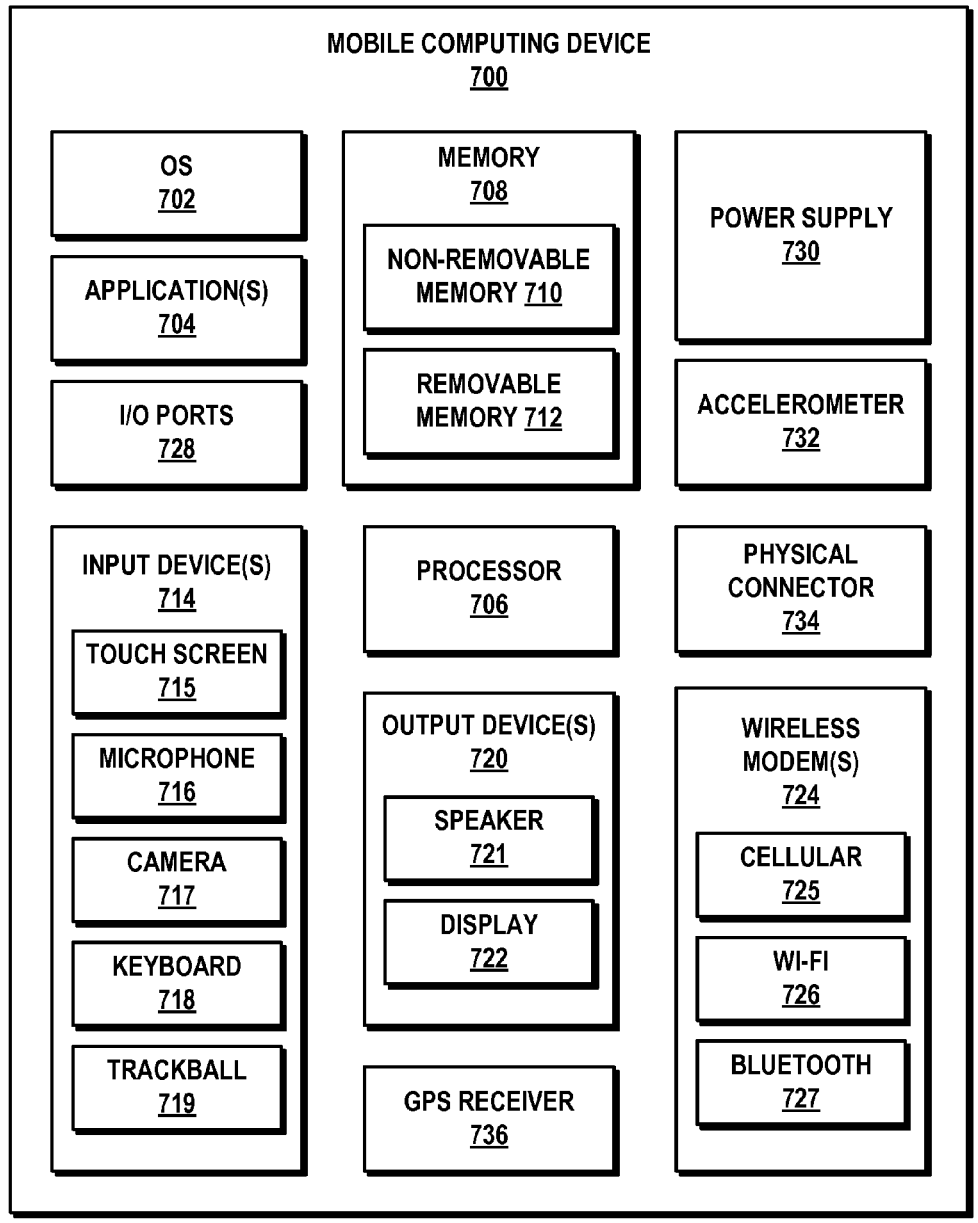
FIG. 7 illustrates an embodiment of an exemplary mobile computing device that may implement aspects of the described subject matter.

FIG. 7 illustrates a mobile computing device 700 as an embodiment of an exemplary mobile computing device that may implement aspects of the described subject matter. In various implementations, mobile computing device 700 may be an example of one or more of: client devices 101-104, client devices 301-305, and/or computing device 510.

As shown, mobile computing device 700 includes a variety of hardware and software components that may communicate with each other. Mobile computing device 700 may represent any of the various types of mobile computing device described herein and can allow wireless two-way communication over a network, such as one or more mobile communications networks (e.g., cellular and/or satellite network), a LAN, and/or a WAN.

Mobile computing device 700 can include an operating system 702 and various types of mobile application(s) 704. In some implementations, mobile application(s) 704 may include one or more client application(s) and/or components of speaker recognition code 520.

Mobile computing device 700 can include a processor 706 (e.g., signal processor, microprocessor, ASIC, or other control and processing logic circuitry) for performing tasks such as: signal coding, data processing, input/output processing, power control, and/or other functions.

Mobile computing device 700 can include memory 708 implemented as non-removable memory 710 and/or removable memory 712. Non-removable memory 710 can include RAM, ROM, flash memory, a hard disk, or other memory device. Removable memory 712 can include flash memory, a Subscriber Identity Module (SIM) card, a "smart card" and/or other memory device.

Memory 708 can be used for storing data and/or code for running operating system 702 and/or mobile application(s) 704. Example data can include web pages, text, images, sound files, video data, or other data to be sent to and/or received from one or more network servers or other devices via one or more wired and/or wireless networks. Memory 708 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 700 can include and/or support one or more input device(s) 714, such as a touch screen 715, a microphone 716, a camera 717, a keyboard 718, a trackball 719, and other types of input devices (e.g., a Natural User Interface (NUI) device and the like). Touch screen 715 may be implemented, for example, using a capacitive touch screen and/or optical sensors to detect touch input. Mobile computing device 700 can include and/or support one or more output device(s) 720, such as a speaker 721, a display 722, and/or other types of output devices (e.g., piezoelectric or other haptic output devices). In some implementations, touch screen 715 and display 722 can be combined in a single input/output device.

Mobile computing device 700 can include wireless modem(s) 724 that can be coupled to antenna(s) (not shown) and can support two-way communications between processor 706 and external devices. Wireless modem(s) 724 can include a cellular modem 725 for communicating with a mobile communication network and/or other radio-based modems (e.g., Wi-Fi 726 and/or Bluetooth 727). Typically, at least one of wireless modem(s) 724 is configured for: communication with one or more cellular networks, such as a GSM network for data and voice communications within a single cellular network; communication between cellular networks; or communication between mobile computing device 700 and a public switched telephone network (PSTN).

Mobile computing device 700 can further include at least one input/output port 728, a power supply 730, an accelerometer 732, a physical connector 734 (e.g., a USB port, IEEE 1394 (FireWire) port, RS-232 port, and the like), and/or a Global Positioning System (GPS) receiver 736 or other type of a satellite navigation system receiver. It can be appreciated the illustrated components of mobile computing device 700 are not required or all-inclusive, as various components can be omitted and other components can be included in various embodiments.

In various implementations, components of mobile computing device 700 may be configured to perform various operations described in connection with one or more of client devices 101-104 and/or client devices 301-304. Computer-executable instructions for performing such operations may be stored in a computer-readable storage medium, such as memory 708 for instance, and may be executed by processor 706.

Figure 8:
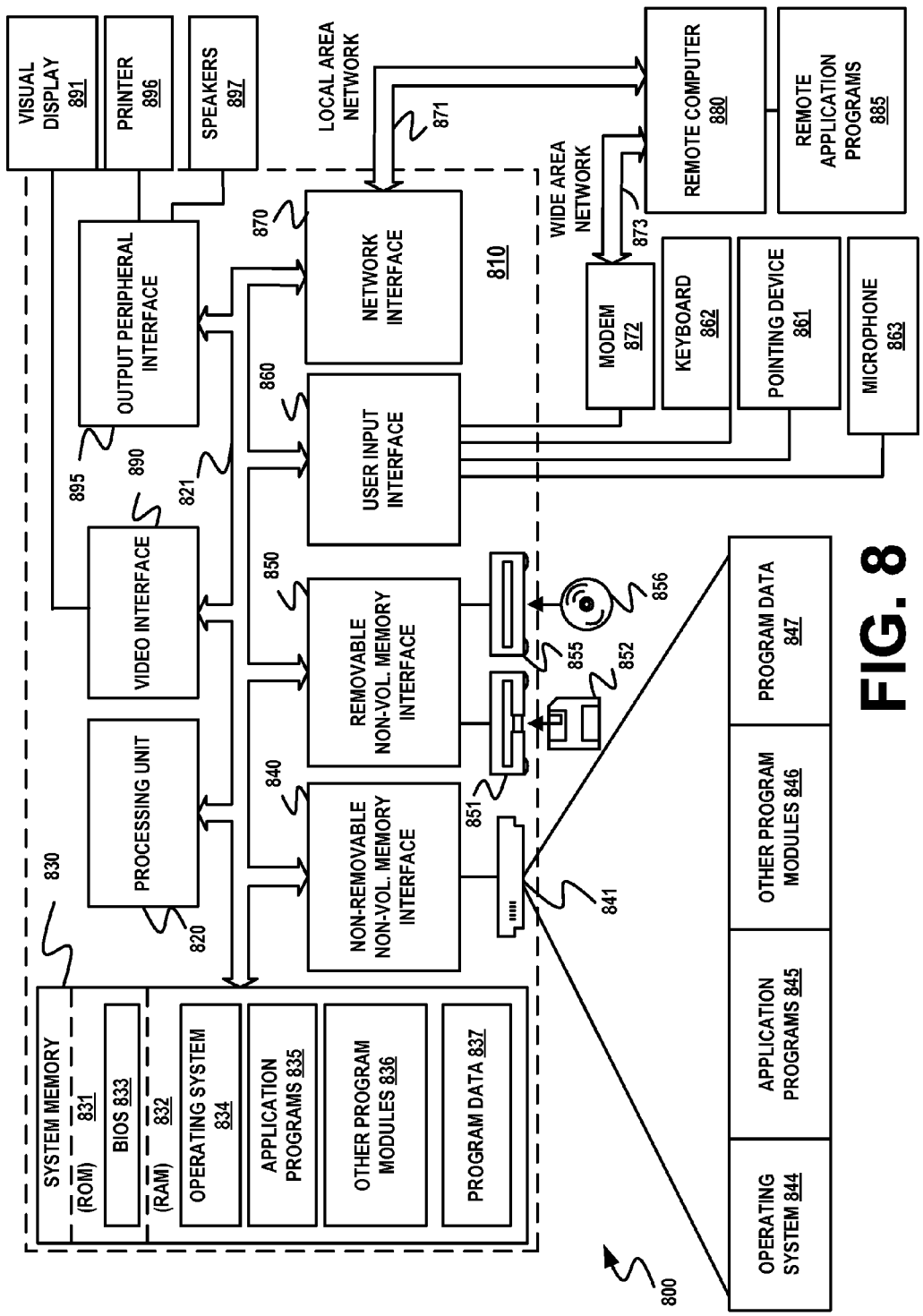
FIG. 8 illustrates an embodiment of an exemplary computing environment that may implement aspects of the described subject matter.

FIG. 8 illustrates a computing environment 800 as an embodiment of an exemplary computing environment that may implement aspects of the described subject matter. As shown, computing environment 800 includes a general-purpose computing device in the form of a computer 810. In various implementations, computer 810 may be an example of one or more of: client devices 101-104, a computing device of computer system 110, client devices 301-305, a computing device of computer system 310, computing device 510, a computing device of computer system 530, a computing device of computer system 600, and/or mobile computing device 700.

Computer 810 may include various components that include, but are not limited to: a processing unit 820 (e.g., one or processors or type of processing unit), a system memory 830, and a system bus 821 that couples various system components including the system memory 830 to processing unit 820.

System bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 830 includes computer storage media in the form of volatile and/or nonvolatile memory such as ROM 831 and RAM 832. A basic input/output system (BIOS) 833, containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, an operating system 834, application programs 835, other program modules 836, and program data 837 are shown.

Computer 810 may also include other removable/non-removable and/or volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 841 is typically connected to system bus 821 through a non-removable memory interface such as interface 840, and magnetic disk drive 851 and optical disk drive 855 are typically connected to system bus 821 by a removable memory interface, such as interface 850.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 8, provide storage of computer readable instructions, data structures, program modules and other data for the computer 810. For example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a touch screen joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB).

A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

Computer 810 is operated in a networked environment using logical connections to one or more remote computers, such as a remote computer 880. Remote computer 880 may be a personal computer, a hand-held device, a server, a router, a network PC, a peer device or other common network node, and typically includes many or all of the elements described above relative to the computer 810. The logical connections depicted include a local area network (LAN) 871 and a wide area network (WAN) 873, but may also include other networks. Such networking environments are commonplace in offices, enterprise-wide computer networks, intranets and the Internet.

When used in a LAN networking environment, computer 810 is connected to LAN 871 through a network interface or adapter 870. When used in a WAN networking environment, computer 810 typically includes a modem 872 or other means for establishing communications over the WAN 873, such as the Internet. Modem 872, which may be internal or external, may be connected to system bus 821 via user input interface 860, or other appropriate mechanism. In a networked environment, program modules depicted relative to computer 810, or portions thereof, may be stored in a remote memory storage device. By way of example, and not limitation, remote application programs 885 as shown as residing on remote computer 880. It will be appreciated that the network connections shown are exemplary and other means of establishing a communications link between the computers may be used.

Supported Aspects

The detailed description provided above in connection with the appended drawings explicitly describes and supports various aspects in accordance with the described subject matter. By way of illustration and not limitation, supported aspects include a computer system for communicating metadata that identifies a current speaker, the computer system comprising: a processor configured to execute computer-executable instructions; and memory storing computer-executable instructions configured to: receive audio data that represents speech of the current speaker; generate an audio fingerprint of the current speaker based on the audio data; perform automated speaker recognition by comparing the audio fingerprint of the current speaker against stored audio fingerprints contained in a speaker fingerprint repository; communicate data indicating that the current speaker is unrecognized to a client device of an observer; receive tagging information that identifies the current speaker from the client device of the observer; store the audio fingerprint of the current speaker and metadata that identifies the current speaker in the speaker fingerprint repository; and communicate the metadata that identifies the current speaker to at least one of the client device of the observer or a client device of a different observer.

Supported aspects include the forgoing computing system, wherein the memory further stores computer-executable instructions configured to: resolve conflicting tagging information by identifying the current speaker based on an identity supplied by a majority of observers.

Supported aspects include any of the forgoing computing systems, wherein the memory further stores computer-executable instructions configured to: receive confirmation that current speaker has been correctly identified.

Supported aspects include any of the forgoing computing systems, wherein the memory further stores computer-executable instructions configured to: retrieve additional information for the current speaker from an information source; and communicate the additional information in the metadata that identifies the current speaker.

Supported aspects include any of the forgoing computing systems, wherein the additional information includes one or more of: a company of the current speaker, a department of the current speaker, a job title of the current speaker, or contact information for the current speaker.

Supported aspects include any of the forgoing computing systems, wherein the memory further stores computer-executable instructions configured to: generate augmented audio data that includes the audio data that represents speech of the current speaker and the metadata that identifies the current speaker.

Supported aspects include any of the forgoing computing systems, wherein the metadata that identifies the current speaker is communicated to the client device of the observer or the client device of the different observer via the augmented audio data.

Supported aspects include any of the forgoing computing systems, wherein the memory further stores computer-executable instructions configured to: store the augmented audio data; receive a query indicating a recognized speaker; search the augmented audio data for metadata that identifies the recognized speaker; and output portions of the augmented audio data that represent speech of the recognized speaker.

Supported aspects include any of the forgoing computing systems, wherein the memory further stores computer-executable instructions configured to: generate a transcription of a conversation having multiple speakers, wherein text of speech spoken by a recognized speaker is associated with an identifier for the recognized speaker; store the transcription; receive a query indicating the recognized speaker; search the transcription for the identifier for the recognized speaker; and output portions of the transcription that include the text of speech spoken by the recognized speaker.

Supported aspects include any of the forgoing computing systems, wherein the memory further stores computer-executable instructions configured to: receive subsequent audio data representing speech of the current speaker; generate a new audio fingerprint of the current speaker based on the subsequent audio data; perform speaker recognition by comparing the new audio fingerprint of the current speaker against the stored audio fingerprint of the current speaker; and communicate the metadata that identifies the current speaker to the client device of the observer or the client device of the different observer.

Supported aspects include any of the forgoing computing systems, wherein the memory further stores computer-executable instructions configured to: receive a request that identifies a particular recognized speaker from the client device of the observer; and communicate an alert to the client device of the observer when the particular recognized speaker is currently speaking.

Supported aspects include any of the forgoing computing systems, wherein the memory further stores computer-executable instructions configured to: provide an online meeting for participants; receive an audio fingerprint of a participant from a client device of the participant; and store the audio fingerprint of the participant and metadata that identifies the participant in the speaker fingerprint repository.

Supported aspects include any of the forgoing computing systems, wherein the memory further stores computer-executable instructions configured to: communicate the audio fingerprint of the current speaker to the client device of the observer.

Supported aspects further include an apparatus, a computer-readable storage medium, a computer-implemented method, and/or means for implementing any of the foregoing computer systems or portions thereof.

Supported aspects include a computer-implemented method for communicating metadata that identifies a current speaker performed by a computer system including one or more computing devices, the computer-implemented method comprising: generating an audio fingerprint of the current speaker based on audio data that represents speech of the current speaker; performing automated speaker recognition based on the audio fingerprint of the current speaker and stored audio fingerprints; receiving tagging information that identifies the current speaker from a client device of an observer when the current speaker is unrecognized; storing the audio fingerprint of the current speaker and metadata that identifies the current speaker; and communicating the metadata that identifies the current speaker to at least one of the client device of the observer or a client device of a different observer.

Supported aspects include the forgoing computer-implemented method, further comprising: communicating data indicating that the current speaker is unrecognized to the client device of the observer.

Supported aspects include any of the forgoing computer-implemented methods, further comprising: resolving conflicting tagging information by identifying the current speaker based on an identity supplied by a majority of observers.

Supported aspects include any of the forgoing computer-implemented methods, further comprising: generating a new audio fingerprint of the current speaker based on subsequent audio data that represents speech of the current speaker; and performing speaker recognition based on the new audio fingerprint of the current speaker and the stored audio fingerprint of the current speaker.

Supported aspects further include a system, an apparatus, a computer-readable storage medium, and/or means for implementing and/or performing any of the foregoing computer-implemented methods or portions thereof.

Supported aspects include a computer-readable storage medium storing computer-executable instructions that, when executed by a computing device, cause the computing device to implement: a speaker recognition component configured to generate an audio fingerprint of the current speaker based on audio data that represents speech of the current speaker and perform automated speaker recognition by comparing the audio fingerprint of the current speaker against stored audio fingerprints; a tagging component configured to receive tagging information that identifies the current speaker from a client device of an observer when the automated speaker recognition is unsuccessful and store the audio fingerprint of the current speaker with the stored audio fingerprints; and an audio data enrichment component configured to communicate metadata that identifies the current speaker to a client device of the observer or a client device of a different observer.

Supported aspects include the forgoing computer-readable storage medium, wherein the tagging component is further configured resolve conflicting tagging information by identifying the current speaker based on an identity supplied by a majority of observers.

Supported aspects include any of the forgoing computer-readable storage media, further wherein the audio data enrichment component is configured to communicate the audio data that represents speech of the current speaker and the metadata that identifies the current speaker as synchronized streams of audio data and metadata.

Supported aspects may provide various attendant and/or technical advantages in terms of improved efficiency and/or savings with respect to power consumption, memory, processor cycles, and/or other computationally-expensive resources.

The detailed description provided above in connection with the appended drawings is intended as a description of examples and is not intended to represent the only forms in which the present examples may be constructed or utilized. It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer system for communicating metadata that identifies a current speaker, the computer system comprising:
    a processor configured to execute computer-executable instructions; and
    memory storing one or more computer-executable instructions that, when executed by the processor, perform operations including:
        receive audio data that represents speech of the current speaker;
        generate an audio fingerprint of the current speaker based on the audio data;
        perform automated speaker recognition including comparing the audio fingerprint of the current speaker against one or more stored audio fingerprints contained in a speaker fingerprint repository;
        communicate data indicating that the current speaker is unrecognized to a first client device of an observer;
        receive tagging information that identifies the current speaker from the first client device of the observer;
        store the audio fingerprint of the current speaker and metadata that identifies the current speaker in the speaker fingerprint repository, the metadata being at least partly based on the tagging information;
        communicate the metadata that identifies the current speaker to at least one of the first client device of the observer or a second client device of a different observer;
        receive a request that identifies a particular speaker from at least one of the first client device of the observer or the second client device of the different observer; and
        communicate an alert to at least one of the first client device of the observer or the second client device of the different observer when the particular speaker is currently speaking.

2. The computer system of claim 1, wherein the memory further stores one or more computer-executable instructions that, when executed by the processor, perform operations including:
    receive additional tagging information that identifies the current speaker from at least one other client device of at least one other observer; and
    resolve a conflict between the tagging information that identifies the current speaker and the additional tagging information that identifies the current speaker by identifying the current speaker based on an identity supplied by a majority of observers.

3. The computer system of claim 1, wherein the memory further stores one or more computer-executable instructions that, when executed by the processor, perform operations including:
    receive confirmation that the current speaker has been correctly identified.

4. The computer system of claim 1, wherein the memory further stores one or more computer-executable instructions that, when executed by the processor, perform operations including:
    retrieve additional information for the current speaker from an information source; and
    communicate the additional information in the metadata that identifies the current speaker.

5. The computer system of claim 4, wherein the additional information includes one or more of: a company of the current speaker, a department of the current speaker, a job title of the current speaker, or contact information for the current speaker.

6. The computer system of claim 1, wherein the memory further stores one or more computer-executable instructions that, when executed by the processor, perform operations including:
    generate augmented audio data that includes the audio data that represents speech of the current speaker and the metadata that identifies the current speaker.

7. The computer system of claim 6, wherein the metadata that identifies the current speaker is communicated to the at least one of the first client device of the observer or the second client device of the different observer via the augmented audio data.

8. The computer system of claim 6, wherein the memory further stores one or more computer-executable instructions that, when executed by the processor, perform operations including:
    store the augmented audio data;
    receive a query indicating a recognized speaker;
    search the augmented audio data for metadata that identifies the recognized speaker; and
    output portions of the augmented audio data that represent speech of the recognized speaker.

9. The computer system of claim 1, wherein the memory further stores one or more computer-executable instructions that, when executed by the processor, perform operations including:

generate a transcription of a conversation having multiple speakers, wherein text of speech spoken by a recognized speaker is associated with an identifier for the recognized speaker;
store the transcription;
receive a query indicating the recognized speaker;
search the transcription for the identifier for the recognized speaker; and
output portions of the transcription that include the text of speech spoken by the recognized speaker.

10. The computer system of claim 1, wherein the memory further stores one or more computer-executable instructions that, when executed by the processor, perform operations including:
receive subsequent audio data representing speech of the current speaker;
generate a new audio fingerprint of the current speaker based on the subsequent audio data;
perform speaker recognition by comparing the new audio fingerprint of the current speaker against the stored audio fingerprint of the current speaker; and
communicate the metadata that identifies the current speaker to the client device of the observer or the client device of the different observer.

11. The computer system of claim 1, wherein the memory further stores one or more computer-executable instructions that, when executed by the processor, perform operations including:
operate on metadata included in augmented audio data that is being communicated in real time to determine that the particular speaker is currently speaking; and
wherein communicate an alert to at least one of the first client device of the observer or the second client device of the different observer when the particular speaker is currently speaking includes transmit data to the at least one of the first client device of the observer or the second client device of the different observer for generating at least one of an audible or visual alert whenever the particular speaker talks.

12. The computer system of claim 1, wherein the memory further stores one or more computer-executable instructions that, when executed by the processor, perform operations including:
provide an online meeting for participants;
receive an audio fingerprint of a participant from at least one client device of at least one participant; and
store the audio fingerprint of at least one participant and metadata that identifies at least one participant in the speaker fingerprint repository.

13. The computer system of claim 1, wherein the memory further stores one or more computer-executable instructions that, when executed by the processor, perform operations including:
communicate the audio fingerprint of the current speaker to the first client device of the observer.

14. A computer-implemented method for communicating metadata that identifies a current speaker performed by a computer system including one or more computing devices, the computer-implemented method comprising:
generating an audio fingerprint of the current speaker based on audio data that represents speech of the current speaker;
performing automated speaker recognition based on the audio fingerprint of the current speaker and one or more stored audio fingerprints;
receiving tagging information that identifies the current speaker from a first client device of an observer when the current speaker is unrecognized;
storing the audio fingerprint of the current speaker and metadata that identifies the current speaker, the metadata being at least partly based on the tagging information;
communicating the metadata that identifies the current speaker to at least one of the first client device of the observer or a second client device of a different observer;
receive a request that identifies a particular speaker from the first client device of the observer or the second client device of the different observer; and
communicate an alert to at least one of the first client device of the observer or the second client device of the different observer when the particular speaker is currently speaking.

15. The computer-implemented method of claim 14, further comprising:
communicating data indicating that the current speaker is unrecognized to the client device of the observer.

16. The computer-implemented method of claim 14, further comprising:
receiving additional tagging information that identifies the current speaker from at least one other client device of at least one other observer; and
resolving a conflict between the tagging information that identifies the current speaker and the additional tagging information that identifies the current speaker by identifying the current speaker based on an identity supplied by a majority of observers.

17. The computer-implemented method of claim 14, further comprising:
generating a new audio fingerprint of the current speaker based on subsequent audio data that represents speech of the current speaker; and
performing speaker recognition based on the new audio fingerprint of the current speaker and the stored audio fingerprint of the current speaker.

18. A computer-readable storage medium storing computer-executable instructions that, when executed by a computing device, cause the computing device to implement:
a speaker recognition component configured to generate an audio fingerprint of the current speaker based on audio data that represents speech of the current speaker and perform automated speaker recognition by comparing the audio fingerprint of the current speaker against stored audio fingerprints;
a tagging component configured to receive tagging information that identifies the current speaker from a first client device of an observer when the automated speaker recognition is unsuccessful and store the audio fingerprint of the current speaker with the stored audio fingerprints;
an audio data enrichment component configured to communicate metadata that identifies the current speaker to the first client device of the observer or a second client device of a different observer, the metadata being at least partly based on the tagging information; and
an alert component configured to receive a request that identifies a particular speaker from at least one of the first client device of the observer or the second client device of the different observer, and communicate an alert to at least one of the first client device of the observer or the second client device of the different observer when the particular speaker is currently speaking.

19. The computer-readable storage medium of claim 18, wherein the tagging component is further configured to resolve receive additional tagging information that identifies the current speaker from at least one other client device of at least one other observer, and resolve a conflict between the tagging information that identifies the current speaker and the additional tagging information that identifies the current speaker by identifying the current speaker based on an identity supplied by a majority of observers.

20. The computer-readable storage medium of claim 18, wherein the audio data enrichment component is configured to communicate the audio data that represents speech of the current speaker and the metadata that identifies the current speaker as synchronized streams of audio data and metadata.

* * * * *